US008577705B1

(12) United States Patent
Baboo et al.

(10) Patent No.: US 8,577,705 B1
(45) Date of Patent: Nov. 5, 2013

(54) METHOD AND SYSTEM FOR RATING THE ROLE OF A PRODUCT CATEGORY IN THE PERFORMANCE OF A STORE AREA

(75) Inventors: Priya Baboo, State College, PA (US);
Rajeev Sharma, State College, PA (US);
Varij Saurabh, State College, PA (US);
Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 846 days.

(21) Appl. No.: 12/317,918

(22) Filed: Dec. 30, 2008

(51) Int. Cl.
*G06Q 40/00* (2012.01)
(52) U.S. Cl.
USPC .................................. 705/7.11; 705/7.42
(58) Field of Classification Search
USPC .................................. 705/7, 7.11–7.42
See application file for complete search history.

(56) References Cited

U.S. PATENT DOCUMENTS

| | | | | |
|---|---|---|---|---|
| 5,956,693 | A * | 9/1999 | Geerlings | 705/14.53 |
| 6,073,112 | A * | 6/2000 | Geerlings | 705/14.53 |
| 6,563,423 | B2 | 5/2003 | Smith | |
| 7,162,432 | B2 * | 1/2007 | Mascarenhas | 705/7.32 |
| 8,010,400 | B2 * | 8/2011 | Mascarenhas | 705/7.29 |
| 2002/0029162 | A1 * | 3/2002 | Mascarenhas | 705/10 |
| 2003/0083925 | A1 | 5/2003 | Weaver et al. | |
| 2006/0010030 | A1 * | 1/2006 | Sorensen | 705/10 |
| 2006/0015408 | A1 | 1/2006 | Brown | |
| 2007/0033084 | A1 * | 2/2007 | Mascarenhas | 705/7 |
| 2007/0156515 | A1 * | 7/2007 | Hasselback et al. | 705/14 |
| 2008/0005045 | A1 | 1/2008 | Sorensen et al. | |
| 2009/0106085 | A1 * | 4/2009 | Raimbeault | 705/10 |

OTHER PUBLICATIONS

U.S. Appl. No. 11/805,321, Sharma, et al.
U.S. Appl. No. 11/818,554, Sharma, et al.
U.S. Appl. No. 11/999,649, Jung, et al.
U.S. Appl. No. 12/011,385, Sharma, et al.
U.S. Appl. No. 12/215,877, Sharma, et al.
J. F. Cohn, et al., "Automated face analysis by feature point tracking has high concurrent validity with manual FACS coding," Psychophysiology, pp. 35-43, 1999.
I. A. Essa and A. P. Pentland, "Facial expression recognition using a dynamic model and motion energy," presented at International Conference on Computer Vision, Jun. 1995.
Y. Yacoob and L. S. Davis, "Recognizing human facial expression," University of Maryland, Technical Report CS-TR-3265, May 1994.

* cited by examiner

*Primary Examiner* — Thomas Dixon
*Assistant Examiner* — Benjamin S Fields

(57) ABSTRACT

The present invention is a method and system for measuring a set of shopper behavior metrics that represent the strength of a product category or a group of categories in the performance of a store area. A set of rating parameters are defined in order to provide a unified and standardized rating system. The rating system represents the effectiveness of the product category in a store area. The metrics are defined in a manner that is normalized so that they can be used across different types of product categories. The datasets are measured per category or group of categories over time to identify how the strength has varied over time, and to monitor trends in the category performance. The measured datasets are further analyzed based on various demographic groups and behavior segments. The analysis facilitates a better understanding of the strength of the category for different shopper segments, which in turn can be applied for developing better store area optimization strategies.

28 Claims, 13 Drawing Sheets

| CATEGORY Cp | | DEMOGRAPHICS | | | TOT |
|---|---|---|---|---|---|
| COUNT (INTEGER) | | DEMO CLASS 1 | DEMO CLASS 2 | DEMO CLASS 3 | |
| EXPOSURE | EX1 | 127 | 373 | 532 | 1032 |
| | EX2 | 98 | 342 | 472 | 912 |
| | EX3 | 84 | 319 | 421 | 824 |
| ENGAGE | EN1 | 83 | 307 | 348 | 738 |
| | EN2 | 76 | 276 | 334 | 686 |
| | EN3 | 56 | 218 | 248 | 522 |
| PURCHASE | P1 | 51 | 204 | 218 | 473 |
| | P2 | 49 | 158 | 169 | 376 |
| | P3 | 30 | 136 | 130 | 296 |

—621

| CONVERSION RATIO (%) | DEMO. | | | TOT |
|---|---|---|---|---|
| | C1 | C2 | C3 | |
| CR1 | 77 | 92 | 89 | 88 |
| CR2 | 86 | 93 | 89 | 90 |
| CR3 | 99 | 96 | 83 | 90 |
| CR4 | 92 | 90 | 96 | 93 |
| CR5 | 74 | 79 | 74 | 76 |
| CR6 | 91 | 94 | 88 | 91 |
| CR7 | 96 | 77 | 78 | 79 |
| CR8 | 61 | 86 | 77 | 79 |

| CATEGORY Cq | | DEMOGRAPHICS | | | TOT |
|---|---|---|---|---|---|
| COUNT (INTEGER) | | DEMO CLASS 1 | DEMO CLASS 2 | DEMO CLASS 3 | |
| EXPOSURE | EX1 | 139 | 268 | 78 | 485 |
| | EX2 | 136 | 247 | 71 | 454 |
| | EX3 | 134 | 227 | 70 | 430 |
| ENGAGE | EN1 | 122 | 56 | 67 | 244 |
| | EN2 | 118 | 52 | 66 | 236 |
| | EN3 | 112 | 44 | 63 | 218 |
| PURCHASE | P1 | 85 | 11 | 15 | 111 |
| | P2 | 43 | 3 | 5 | 51 |
| | P3 | 3 | 1 | 2 | 6 |

623

| CONVER-SION RATIO (%) | DEMO. | | | TOT |
|---|---|---|---|---|
| | C1 | C2 | C3 | |
| CR1 | 98 | 92 | 91 | 94 |
| CR2 | 99 | 92 | 99 | 95 |
| CR3 | 91 | 25 | 96 | 57 |
| CR4 | 97 | 93 | 99 | 96 |
| CR5 | 95 | 85 | 95 | 93 |
| CR6 | 76 | 25 | 24 | 51 |
| CR7 | 51 | 27 | 33 | 46 |
| CR8 | 7 | 33 | 40 | 12 |

METHOD AND SYSTEM FOR RATING THE ROLE OF A PRODUCT CATEGORY IN THE PERFORMANCE OF A STORE AREA

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of the Invention

The present invention is a method and system for measuring a set of shopper behavior metrics that represent the strength of a product category or a group of categories in the performance of a store area, capturing images of the people in the vicinity of categories in a store area by a plurality of means for capturing images, such as cameras, processing the input images in order to analyze the behavior of the people, and computing the behavior metrics in consideration of the category performance in a store area.

2. Background of the Invention

Product category management has been recognized as an important process in stocking a necessary amount of the demanded products on the shelves in retail stores to maximize sales. For example, U.S. Pat. Appl. Pub. No. 2003/0083925 of Weaver, et al. (hereinafter Weaver) disclosed an automated product data collection system that enables retailers to make more informed decisions with regard to the procurement, stocking, and advertising of products. Weaver discussed the importance of the sophisticated product management analysis as influencing to the product sales and customer satisfaction level. Weaver is an exemplary prior art that requires an intelligent category strength measurement in order to produce better category assessment results. However, Weaver does not disclose methods of measuring the strength of categories in a store area.

There has been no prior attempt at measuring the strength of a category at retail in the manner proposed in the present invention, i.e., based on video analytics for the images captured by means for capturing images, such as cameras. The following prior arts employ alternative technologies, like Radio Frequency Identification (RFID), for determining the effectiveness of various in-store elements, but they do not make a reference about measuring the strength of a category in a retail environment.

U.S. Pat. Appl. Pub. No. 2008/0005045 of Sorensen, et al. (hereinafter Sorensen) disclosed a system and method to analyze shopper data from various shopping environments for determining the exposure ratings of media such as product advertisements and displays. The measures evaluated to arrive at exposure ratings were shopper density, shopper flow, and transaction information.

U.S. Pat. No. 6,563,423 of Smith disclosed a location tracking system to track the movements of customers. This tracking is used to determine a customer's pace, how long a customer stayed at a particular location, and to determine how many customers passed a location. The purchase of a customer is determined by reading the tagged code at the time of purchase and relating this to whether or not the customer visited a particular display earlier.

U.S. Pat. Appl. Pub. No. 2006/0015408 of Brown describes a product purchase and sales tracking system comprising an RFID tag that is being placed on a product to be tracked, two RFID readers detecting the purchase of the product from the point of purchase and generating a time-stamp, and at least one tracking server programmed to identify in real-time the purchase of the product.

The present invention differs from the above inventions in its ability to define and measure the strength of a category and a group of categories in a store area in maximizing sales in the particular store area. Further, the present invention provide's an objective, unified framework for measuring the strength of a category and a group of categories in a store area, based on a set of shopper response attributes, including behavior analysis, impression level, and emotional change. The rating is further analyzed based on the segmentation data of shoppers, such as demographics, which can be calculated based on an application of automatic computer vision algorithms to the images of shoppers. The rating is conducted by employing automated and semi-automated video-based analysis that involves computer vision technologies.

The present invention addresses the gap by devising a scalable rating system that truly measures the strength of a category and a group of categories in a store area, based on a set of shopper response attributes. In an exemplary embodiment, the metrics can be obtained after automatically tracking in-store shopper behavior from an entire population of shoppers to the category. In this embodiment, the depth and breadth of information obtained from the present invention will be very effective for determining the strength of a category.

Conventionally, companies in prior arts conduct manual in-store observation studies to obtain information about factors impacting sales and promotion performance for categories. The insights obtained from the studies may be useful for understanding retailer compliance to promotional programs, etc., but do not provide any information on shopper behavior with respect to a category. However, the present invention provides a unified framework for rating the strength of a category and a group of categories in a store area based on a set of shopper response metrics. The employment of automated and semi-automated video-based analysis involving computer vision technologies facilitates data gathering from the entire population of shoppers that visit the category, providing in-depth insights.

SUMMARY

Understanding the role of a category in the performance of a store area is critical in improving the productivity of not only a store area but also in improving the overall productivity of the store. However, the role of a category in improving the productivity of a store area has not been clearly understood until now due to the lack of measurements and tools. For example, the performance of several categories in the store has been evaluated based on the amount of sales generated. Unfortunately, this does not identify the true performance of the category.

The present invention aims to fill the gap by devising a scalable method and rating system that truly measures the role of a category in the performance of a store area.

Each category in a store area plays a different role—some are "destinations," i.e., shoppers plan the purchase for these categories, even up to the brand level, prior to entering the store, while others are "impulse" categories, i.e., shoppers make an unplanned purchase because of either the innovativeness and appeal of the display or because of the price promotion. Until now, transaction data and basket analysis have been used to determine the role of a category in an ad hoc manner, but no systematic and computational approach has been proposed to define and measure the category performance rating with respect to shopper behavior.

The present invention defines a set of metrics, called category rating metrics (CRM), and measures a set of shopper behaviors to determine the strength of a category in a store area. The rating system represents the effectiveness of the product category in a store area. The present invention provides a system for computing the metrics by measuring shopping behavior in a store area, which includes a group of categories, using a set of means for capturing images, such as video cameras, and software for extracting relevant behavior data from the video.

The set of rating parameters are defined in such a way to provide a unified and standardized rating system. When the defined set of metrics is computed for a category, it provides a means for tracking the role of the category. The metrics are defined in a manner that is normalized so that they can be used across different types of product categories. By utilizing the standardized measurements from the rating system, the role of any category can be determined in a normalized manner across different types of store areas and product categories in different store formats.

The datasets are measured per category or group of categories over time to identify how the strength has varied over time and to monitor trends in the category performance. In an example, the number of shoppers and buyers in the category relative to the number of shoppers and buyers in the other categories of a store area reflects the importance of the category in a store area. Exemplary behavior measurement comprises eye share, foot share, eye to dollar ratio, and conversion ratios for buyers. The measurements performed by the present invention can comprise category performance measures and category shoppability measures.

This present invention will rank all the categories in a store area, e.g., aisle, to identify the top categories that contribute to the productivity. The measurement of the category performance is ranked and the best performing category or a group of categories is found based on the ranking. One exemplary ranking is calculated based on the number of first-stops as a ratio of total number of category shoppers, i.e., all who stopped within the category, producing the ranking of first-stops among categories. Another ranking can be calculated for the percentage of time engaged with category.

It is an objective of the present invention to measure a set of shopper behavior metrics that represents the role a category or a product category in a store area, such as an aisle, a department, or the entire store, in terms of the overall performance. The set of metrics, i.e., category rating metrics (CRM), can be used to understand the role of category in a store area, helping in space optimization for a store area, e.g., aisle, to optimize the placement of product areas, cross-category promotions and optimize overall retail productivity. The space optimization is to make better use of a store area, such as an aisle, based on the role of each category.

The category rating metrics are defined in such a way that the rating can be combined for multiple store areas and extrapolated to a set of store areas, giving a unified framework for analyzing category performance across a store areas. The set of metrics comprises detailed shopper share for each category, cross-category sequences within a store area, including basket size analysis to identify cross-category purchases of those that are not in the same store area, and destination shoppers, identifying which categories were "traffic builders" and drove trips to the aisle.

The category rating metrics consists of indices defined with respect to observable shopping behavior. The indices comprise category attraction index, category first-stop index, cross-shopping index, category shopper share, category buyer share, category volume share, category dollar share, shopper response rating, and periodic change rating. Each index is measured for a given period, for example, a week or a month. A subset of the indices can be grouped depending on the applications.

The measurement of the category performance can be utilized for various space optimization aspects of a store area. Tasks in the space optimization, based on the category performance measurement, is to find out answers to the questions of which category should be included in a store area, how much space needs to be given to each category, and how to rank the categories to determine the optimal synergy of the categories in the store. The space optimization problem is also related to the shop-ability and navigation issues of a store area for the shoppers.

The space optimization analysis includes analyses of 1) assortment, 2) allocation, and 3) adjacency of the categories in a store area. The assortment is about finding which assortment of categories optimizes a store area performance. The allocation is related to the sequence of categories, e.g., cross-category sequencing in an aisle. In the sequence analysis, the number of first-stops and the number of second-stops are counted for the categories. Another sequence analysis includes a pre and post category analysis. In this analysis the relative order of sequences are counted for the n-tuple, and the statistics shows the dominant appearance of sequences. One of the objectives in this measurement is to find which size of category allocation space; relative position of categories in the allocation space; and shape of category allocation space performs better. The sequence analysis facilitates the understanding of dynamics of a store area. Adjacency is related to the co-occurrence, layout, and correlation of categories. The goal is to find which adjacency of categories makes sense, and which category, i.e., a category, makes which category, i.e. another category, performs better. Unlike the sequence, the order of categories is not significant, but the correlation is more in focus in this analysis. How many people who shop at the category also shop at other categories in a store area, i.e., exposure to adjacent category, also determines the relative correlation between the interests in the category relative to a store area.

The measured datasets are further analyzed based on various demographic groups and behavior segments. The analysis facilitates a better understanding of the relative strength of the category for different shopper segments, which in turn can be applied for developing better strategies for assortment, allocation, and adjacency of the categories in a store area.

Segmentation by demographics and behavior types can be applied for each index in the category rating metrics. Examples of demographic segmentation include gender, ethnic group, and age range, and examples of behavior types include trip type, such as fill-in and stock-up. The segmentation in category performance measurement provides additional detailed information in producing a better design of a store area.

The present invention is concerned with the role of a product category in a store area with different types of products in the category, wherein the products may or may not be related to each other. A shopper who enters a store area may be visiting for more than one product category. In the application of the present invention, different categories in a store area are not necessarily competing. One of the goals of the category rating metrics is to capture the "synergy" between a category and the other categories in a store area. The measurement process for the behavior can be analyzed for the entire store area.

A monadic design approach can be applied to change digital signage, (location of signage, number of signage), navigational signage (map, index), marketing element, merchandizing element, information kiosk, promotional material (coupon) in the category, and measure the effect with regard to the category performance in a store area.

DRAWINGS

Figures

FIG. 7 shows a first exemplary table for traffic count and a first exemplary table for conversion ratio based on the first traffic count table, where the tables are used to measure the strength of a category.

FIG. 8 shows a second exemplary table for traffic count and a second exemplary table for conversion ratio based on the second traffic count table, where the tables are used to measure the strength of another category.

Figure 13:
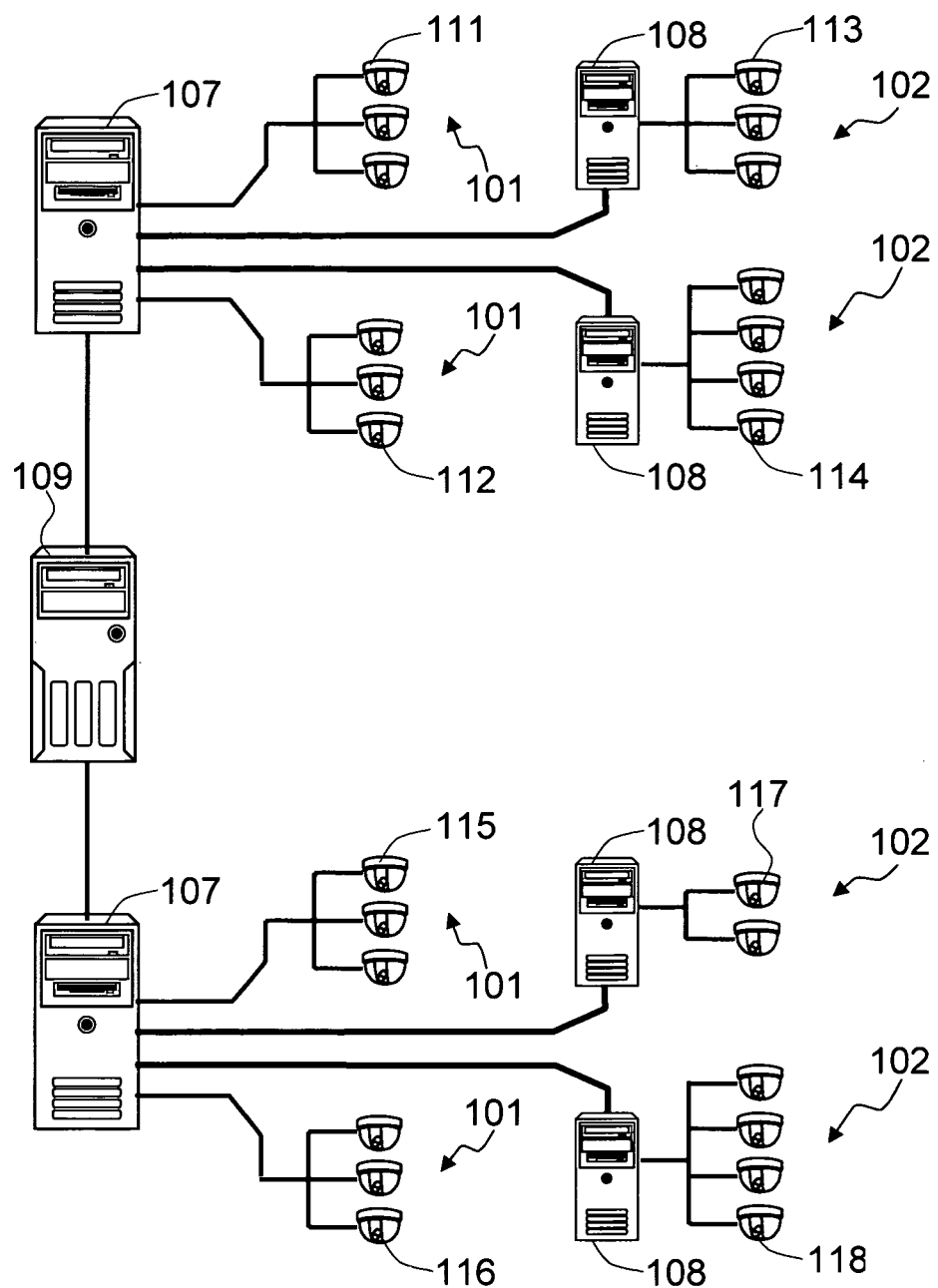

FIG. 13 shows an exemplary network of a plurality of means for control and processing and a plurality of means for capturing images in the present invention, where the network consists of a plurality of first means for control and processing and a plurality of second means for control and processing, which communicate with each other to synchronize the time-stamped lists of measurement among a plurality of video streams captured by the means for capturing images in the measured locations.

DETAILED DESCRIPTION OF THE INVENTION

Figure 1:
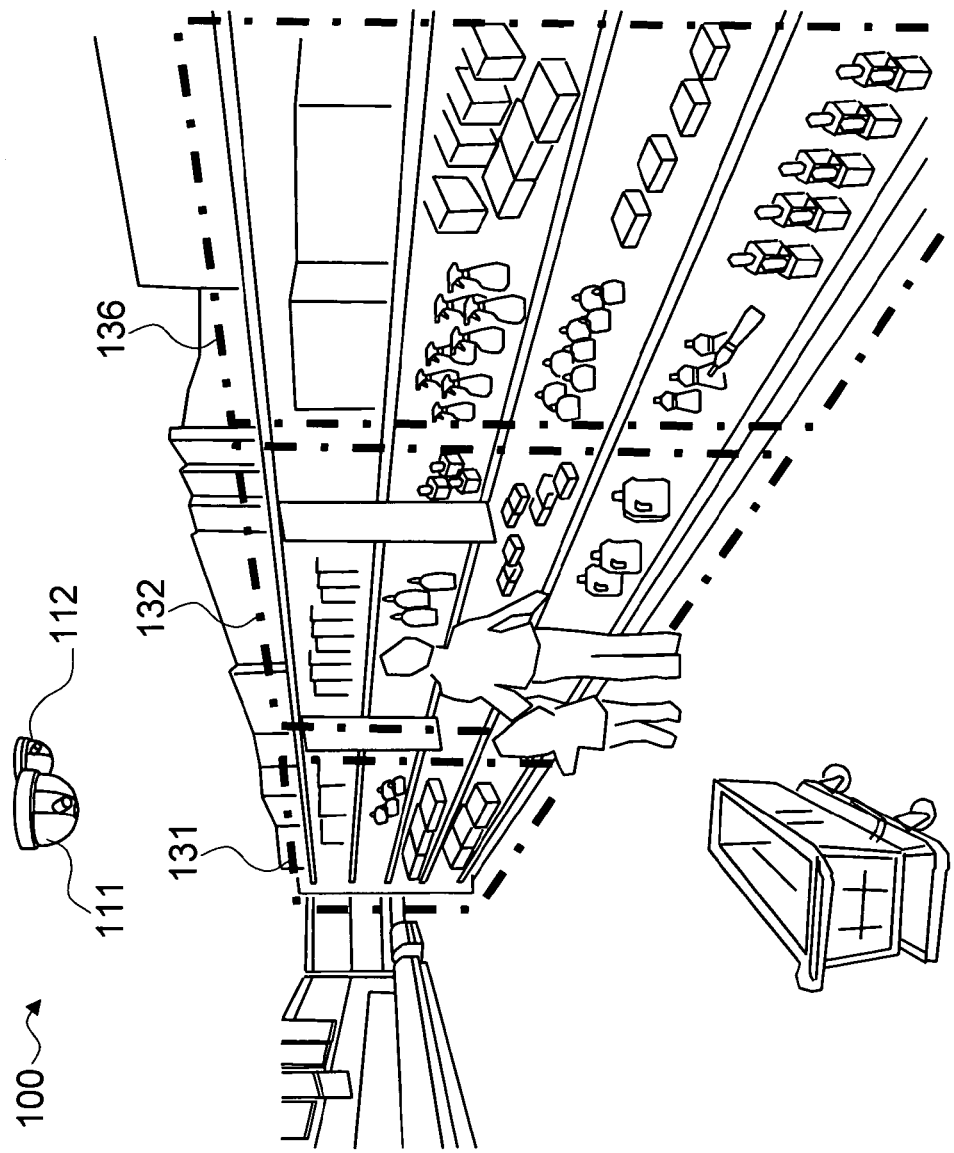
FIG. 1 shows an overview of an application where an exemplary embodiment of the present invention is applied.

FIG. 1 shows an overview of an application where an exemplary embodiment of the present invention is applied.

The present invention is a method and system for rating the role of a product category in the performance of a store area. As discussed, different product categories play different roles in a store area; some are "destinations" and others are more of an "impulse category," as they are attracted by some aspects of the displayed products.

The present invention provides a novel solution that overcomes the ad hoc manners, such as transaction data and basket analysis, which have been used to determine the role of a category in the prior arts, by proposing a systematic and computational approach that defines and measures the category performance rating with respect to shopper behavior.

The present invention defines a set of metrics, called category rating metrics (CRM), and measures a set of shopper behaviors that represent the strength of at least a product category in a store area. The rating system represents the effectiveness of the product category in a store area. The present invention provides a system for computing the metrics with the help of measurement of shopping behavior in a store area, which includes a group of categories, e.g., "category 1" 131, "category 2" 132, and "category N" 136, using a set of means for capturing images 100, e.g. "means for capturing images 1" 111, and "means for capturing images 2" 112, such as video cameras, and software for extracting relevant behavior data from the video.

The set of rating parameters are defined in such a way to provide a unified and standardized rating system. When the defined set of metrics is computed for a category, it provides a means of tracking the role of the category. The metrics are defined in a manner that is normalized so that they can be used across different types of product categories. Based on the standardized measurements in the rating system, the comparison can be made across different types of store formats, store areas, and product categories.

The datasets are measured per category or group of categories over time to identify how the strength has varied over time and to monitor trends in the category performance. In an example, the number of shoppers and buyers in the category relative to the number of shoppers and buyers in the other categories of a store area reflect the importance of the category in a store area. Exemplary behavior measurement comprises eye share, foot share, eye to dollar ratio, and conversion ratios for buyers.

Exemplary measurements performed by the present invention can comprise:
  Number of store area shoppers—this measurement requires the detection of shopping behavior, such as stopping at least one place in a store area,
  Number of category shoppers—this measurement requires the detection of interaction with the category, such as stopping in front of a category,
  First-stop detection by analyzing category shopping behavior,
  Velocity variation of shopper movement in the category,
  Shopping time in the category and a store area,
  Shopping time between buyers vs. non-buyers,
  Shopping time per linear foot—the measurement per linear foot or square foot is used for space allocation analysis,
  Purchase detection or integration with sales data, such as dollar amount spent per foot,
  Demographics recognition of the category and store area shoppers, and
  Trip type or other behavior-based segment recognition.

These exemplary measurements performed by the present invention can be classified as category performance measures or category shoppability measures, as follows:

Category performance measures: These measures include determining the category attraction index, shopper share, buyer response share, volume share, dollar share. Further, shopper response rating for the category will also be determined to obtain the appeal and effectiveness of the category in influencing shoppers.

Category shoppability measures: These measures include identifying the amount of time spent in the category and a store area as well as the variations in the amount of time spent by category buyers and non-buyers. Another aspect of the measure includes determining the number of shoppers for whom the category was the first stop, to evaluate whether the category was a traffic builder for other categories in a store area. Further, the section within the category that was the motivation for the visit to the category will also be determined for an in-depth understanding of the category's role in a store area. The present invention will also determine the category synergy and the sequence in which the categories in a store area were shopped for identifying cross-category promotional opportunities.

The present invention will rank all of the categories in a store area, e.g., an aisle, to identify the top categories that contribute to the productivity. The measurement of the category performance is ranked, and the best performing category or a group of categories is found based on the ranking. One exemplary ranking is calculated based on the number of first-stops as a ratio of total number of category shoppers, i.e., all who stopped within the category, producing the ranking of first-stops among categories. Another ranking can be calculated for the percentage of time engaged with a category.

A set of shopper behavior metrics is measured, where the metrics represent the role a category or a product category in a store area, such as an aisle, a department, or the entire store, in terms of the overall performance.

Category Rating Metrics (CRM)

The set of metrics, i.e., category rating metrics (CRM), can be used to understand the role of a category in a store area, helping in space optimization for a store area, e.g., an aisle, to optimize the placement of product areas or cross-category promotions, and optimize overall retail productivity. The space optimization is important to make better use of a store area, such as an aisle, based on the role of each category. The category rating metrics are defined in such a way that the rating can be combined for multiple store areas and extrapolated to a set of store areas, giving a unified framework for analyzing category performance across store areas. The set of metrics comprises the detailed shopper share for each category; cross-category sequences within a store area, including basket size analysis to identify cross-category purchases of those that are not in the same store area; and destination shoppers, identifying which categories were "traffic builders" and drove trips to the aisle.

The category rating metrics consist of indices defined with respect to observable shopping behavior. The indices comprise a category attraction index, a category first-stop index, a cross-shopping index, a category shopper share, a category buyer share, a category volume share, a category dollar share, a shopper response rating, and a periodic change rating. Each index is measured for a given period, for example, a week or a month. A subset of the indices can be grouped, depending on the applications.

Space Optimization

The measurement of the category performance can be utilized for various space optimization aspects of a store area. Tasks in the space optimization, based on the category performance measurement, are to find out answers to the questions of which category should be included in a store area, how much space needs to be given to each category, and how to rank the categories to determine the optimal synergy of the categories in the store. The space optimization problem is also related to the shoppability and navigation issues of a store area for the shoppers. The space optimization analysis includes analyses of 1) assortment, 2) allocation, and 3) adjacency of the categories in a store area.

Assortment of Categories

The assortment is about finding which assortment of categories optimizes a store area performance. The measurement for the behavior metrics can be executed at the individual category level or at the group of categories level in a store area.

If the assortment is measured based on the shopper behavior metrics at the individual category level, the shopper behavior metrics are created and measured at each member category in a store area. The measurements are aggregated to represent the performance of the overall store area. By changing one or more member categories in the assortment, the assortment is composed of a different group of categories, i.e., a different assortment of categories. The shopper behavior metrics are measured and created at each member category of the new assortment, and the result is compared to the previous assortment. The performance of different assortments can be ordered, and the best performing assortment of categories in a store area can be found based on the comparison of different assortments in the order.

If the assortment is measured based on the shopper behavior metrics at the group of categories level, the shopper behavior metrics are measured for the overall performance in a store area rather than for individual categories, while having a different mix of categories at different measurement durations. The performance of the shopper behavior metrics is compared among the different combinations of categories during the different measurement durations, and the best performing assortment of categories is found.

Allocation of Categories

The allocation is related to the sequence of categories, e.g., cross-category sequencing in an aisle. In the sequence analysis, the number of first-stops and the number of second-stops are counted for the categories. For example, the number of first-stops and second-stops are counted for all of the possible pairs of two categories among the categories in a store area. If the count of first-stops and second-stops shows a higher frequency for a particular sequence of two categories among all of the available pairs of categories, the analysis returns a highest sequence value for the pair of categories. Likewise, the sequence analysis can be computed for the third-stops and so forth. In the sequence analysis, the order of categories in a pair or n-tuple is significant. Therefore, if the order of categories is changed in the pair or n-tuple, the new sequence is regarded as a different sequence of categories from the original sequence, although it may contain the same member categories as the original sequence.

Another sequence analysis includes a pre- and post-category analysis. In this analysis, the relative order of sequences is counted for the n-tuple, and the statistics show the dominant appearance of sequences.

One of the goals in this measurement is to find which size of category allocation space, relative position of categories in the allocation space, and shape of category allocation space performs better. For example, the shape of category allocation space can be linear, in which a group of categories are allocated in a linear fashion. Likewise, the shape of category allocation space can be based on circular, parallel, or any feasible geometrical shape in the physical space. The performance measurement for the group of categories that are allocated in a specific shape of the allocation space can be compared to other performance measurements of the categories that are allocated in different shapes. The comparison will show which shape of allocation for the group of categories will perform best among all of the available shapes of allocation configurations.

The sequence analysis facilitates the understanding of dynamics of a store area. In the analysis, the characteristics of motion or route can be analyzed, and an optimal sequence of categories is found. The optimal sequence of categories can help in reducing the length of shopping distance by the customers in the specific store area. Human navigation analysis comprises measurement of length and time of the movement of people. For example, the interaction time per category measurement can be part of the human navigation analysis. The human navigation analysis is eventually related to the analysis of how easily the people can find a certain category or product category. One application of the analysis is to have a better allocation of the categories which reduces the shopping time of people in a specific store area.

Adjacency of Categories

Adjacency is related to the co-occurrence, layout, and correlation of categories. The goal is to find which adjacency of categories makes sense, and which category, i.e., a category, makes which category, i.e. another category, perform better. Unlike the sequence, the order of categories is not significant, but the correlation is more in focus in this analysis.

How many people who shop at the category also shop at other categories in a store area, i.e., exposure to adjacent category, also determines the relative correlation between the interest in the category relative to a store area.

In order to facilitate the adjacency analysis, an adjacency (correlation) graph can be created and used.

Segmentation

The measured datasets are further analyzed based on various demographic groups and behavior segments. The analysis facilitates a better understanding of the relative strength of the category for different shopper segments, which in turn can be applied for developing better strategies for assortment, allocation, and adjacency of the categories in a store area. Segmentation by demographics and behavior types can be applied for each index in the category rating metrics. Examples of demographic segmentation include gender, ethnic group, and age range, and examples of behavior types include trip types, such as fill-in and stock-up.

The segmentation in category performance measurement provides additional detailed information in producing a better design of a store area. For example, the performance measurement per segmentation can provide information about the categories that share the same segment targets. Based on the information, the categories can be collocated in order to encourage impulse purchases or planned purchases to improve the shopping experience.

The present invention is concerned with the role of a product category in a store area with different types of products in the category, wherein the products may or may not be related to each other. A shopper who enters a store area may be visiting for more than one product category. In the application of the present invention, different categories in a store area are not necessarily competing. One of the goals of the category rating metrics is to capture the "synergy" between a category and the other categories in a store area. The measurement process for the behavior can be analyzed for the entire store area.

A monadic design approach can be applied to change digital signage, (location of signage, number of signage), navigational signage (map, index), marketing element, merchandizing element, information kiosk, promotional material (coupon) in the category, and measure the effect with regard to the category performance in a store area.

The term "category" is defined as a logical entity for a group of products, a group of product types, space, areas in a store, a display of a group of products, or a department with similar relevance in the present invention. The term "subcategory" is also similarly defined as a logical entity for a group of products, a group of product types, space, areas in a store, a display of a group of products, or a department with similar relevance, in regard to the "category" in the present invention.

The "category" can comprise a plurality of "subcategories." The type or characteristics of the "subcategory" do not have to match with those of the "category," but the "subcategory" is defined in connection with the "category" in the present invention. A category is not necessarily a spatially-adjacent single entity, which means a category can consist of multiple distributed physical spaces or detached components.

Figure 2:
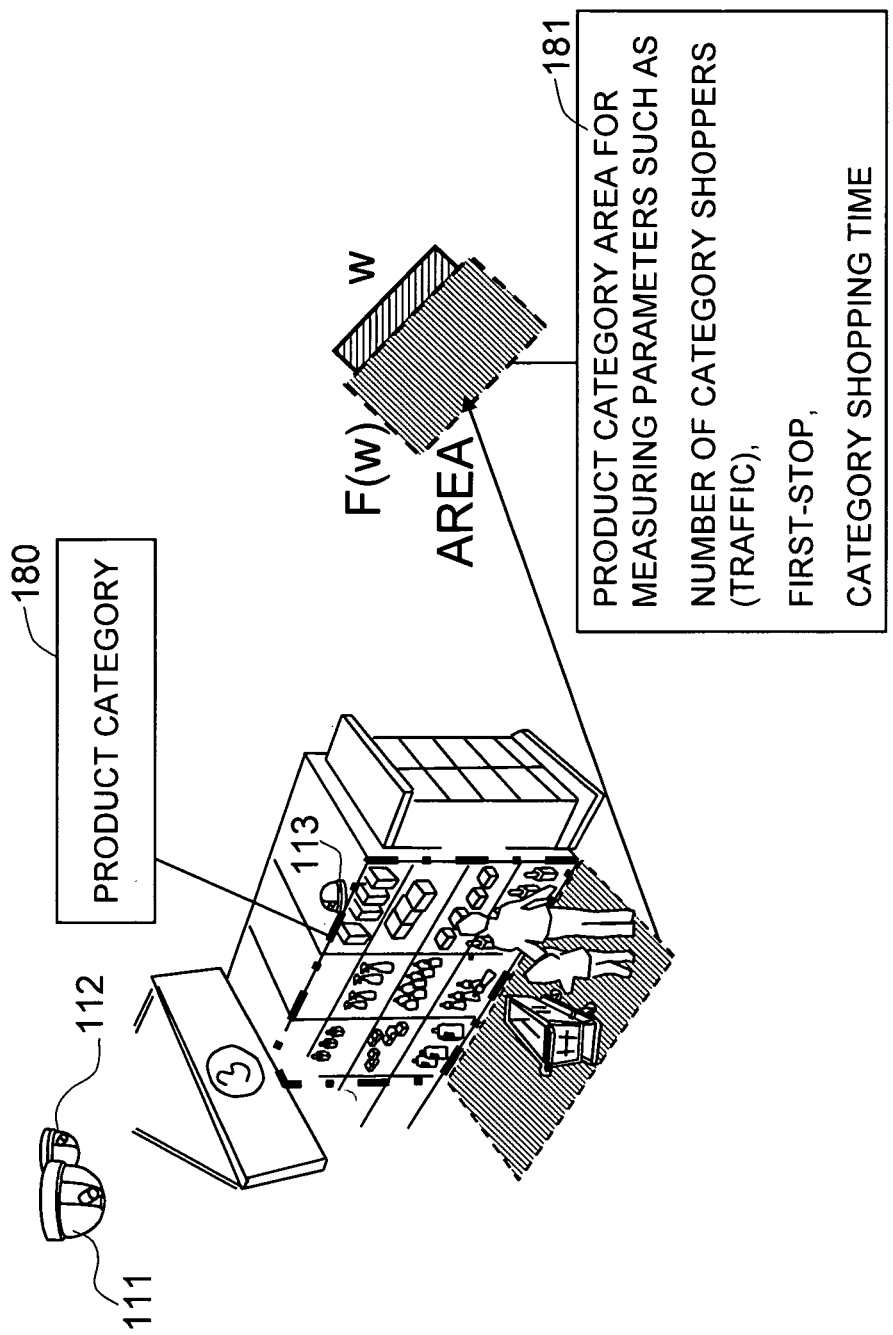
FIG. 2 shows an exemplary product category area.

FIG. 2 shows an exemplary product category area.

In the exemplary embodiment shown in FIG. 2, the product category 180 is a group of products in a shelf space. The product category area 181 is a predefined area in the vicinity of the product category, where the measurement of parameters, such as the number of category shoppers (traffic), counts for the first-stop, and category shopping time, is executed.

The present invention uses a plurality of top-down means for capturing images, e.g., "means for capturing images 1" 111 and "means for capturing images 2" 112, and at least a frontal means for capturing images, e.g., "means for capturing images 3" 113. The top-down means for capturing images is used to count the traffic in the area, e.g. 181, where the category is located, and for detecting the top-down view interactions. Therefore, the top-down means for capturing images is installed at a location, such as the ceiling above the target category area, from which the device can cover the target area, e.g. 181. The frontal means for capturing images is used for detecting the frontal-view interactions and face images of the shopper. The face images are used to analyze the impression level and emotion changes of the people. The frontal means for capturing images is installed in a location where the frontal view of the shopper can be seen by the device.

Figure 3:
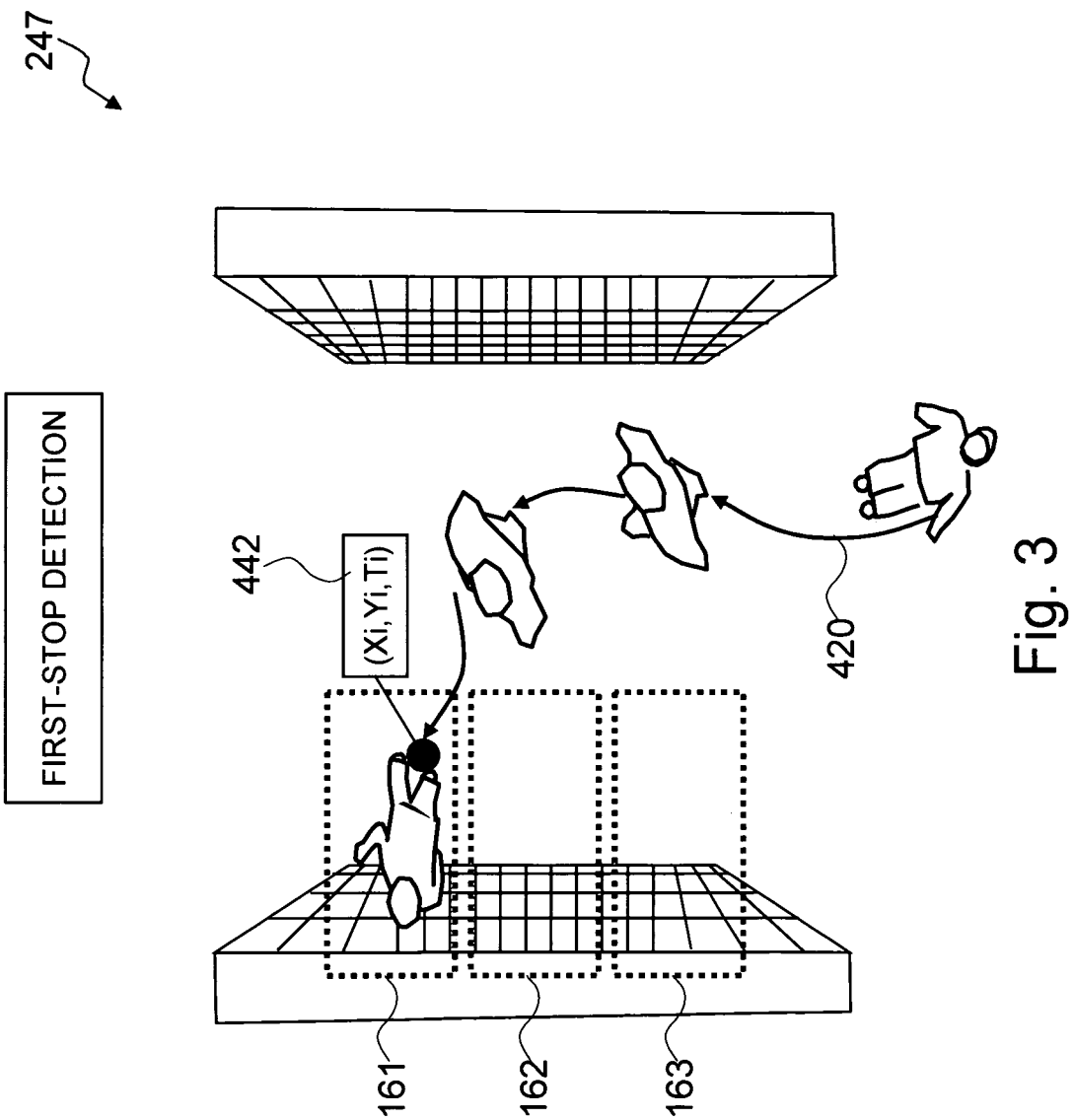
FIG. 3 shows an exemplary view for first-stop detection from a top-down means for capturing images.

FIG. 3 shows an exemplary view for first-stop detection from a top-down means for capturing images.

In the exemplary embodiment shown in FIG. 3, the present invention analyzes the input images from the top-down means for capturing images and increases the traffic count for the category whose associated area is visited by the shoppers in the first-stop detection 247 process. For example, in the exemplary embodiment, a "physical space bounding box for category 1" 161, a "physical space bounding box for category 2" 162, and a "physical space bounding box for category 3" 163 are predefined, and the present invention processes tracking 420 of a person in the vicinity of a category. If the coordinate, i.e., (Xi, Yi, Ti) 442, of the person stays in one of the bounding boxes for longer than a threshold time as a first-stop, the present invention increases the traffic count for the first-stop detection of the category that is associated with the particular bounding box.

In this particular measurement, the first-stop per category is the goal of the measurement. Therefore, if the coordinate of the person's tracking is used to increase the first-stop counter of a category, the following visits to other categories do not increase the first-stop counters of the other categories.

One or more top-down view first means for capturing images is installed in such a way that their fields-of-view can cover the predefined physical space bounding boxes. For the simplicity of explanation, one physical space bounding box is assigned to each vertical column, called "category block," of the shelf space, and it was assumed that one category is associated with each of the physical space bounding boxes per the vertical column in the exemplary embodiment in FIG. 3. However, there can be multiple categories in one vertical column of the shelf space, and the present invention can resolve the situation of multiple categories in one column of the shelf space in coordination of using the frontal-view images from the second means for capturing images. The frontal-view images provide information for which category the shopper intended to make the first-stop, e.g., viewership information about the specific category that the shopper looked at for a certain duration of time, thus correctly increasing correct first-stop counter. An example of using the frontal-view images from the second means for capturing images along with hand tracking to detect the interaction of a shopper will be shown later. In addition, a semi-automatic method can also be used to resolve the situation of multiple categories in one column of the shelf space.

Figure 4:
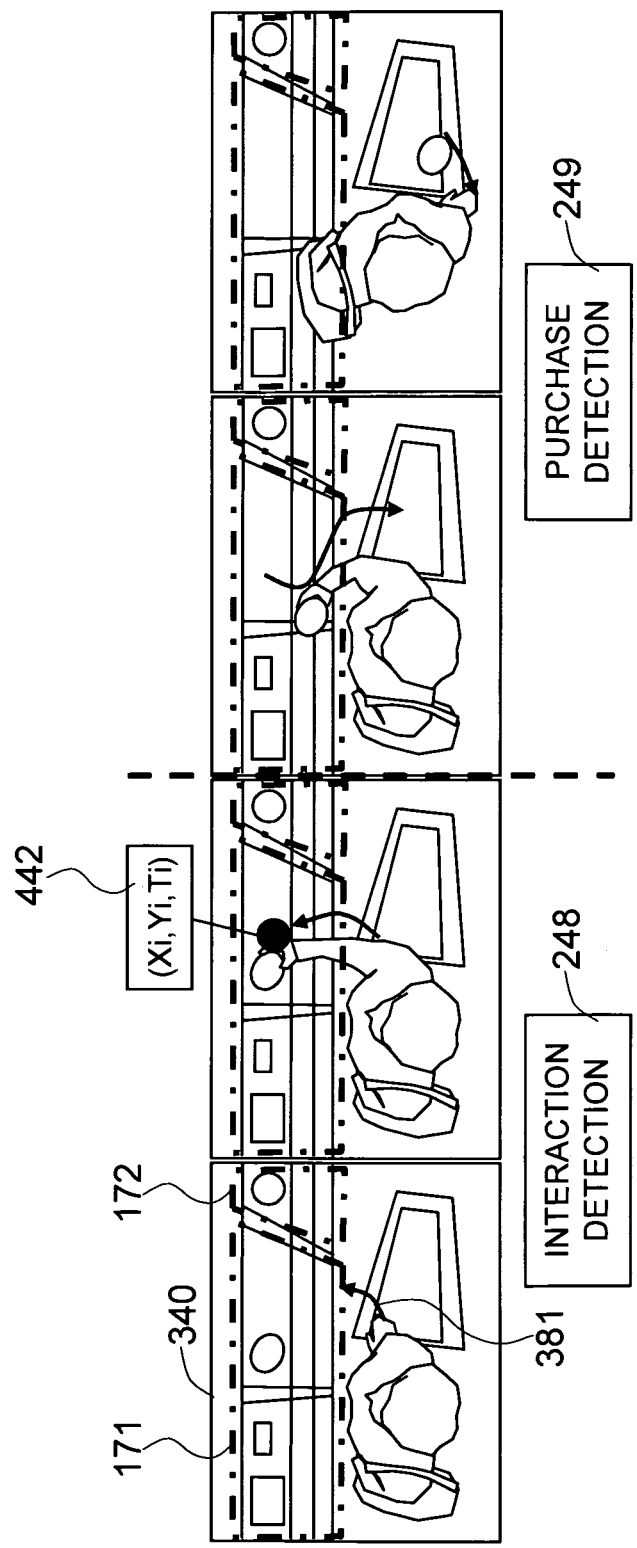
FIG. 4 shows an exemplary view for interaction detection and purchase detection from a top-down means for capturing images.

FIG. 4 shows an exemplary view for interaction detection and purchase detection from a top-down means for capturing images.

In the exemplary embodiment shown in FIG. 4, the present invention analyzes the input images from the top-down means for capturing images, and increases the interaction count if the shopper interacts with a product in the category at the interaction detection 248 process. The present invention also increases the purchase count for the category if the shopper makes a purchase at the purchase detection process 249.

For example, in the exemplary embodiment, a "shelf space bounding box for category 1" 171 and a "shelf space bounding box for category 2" 172 are predefined in the camera view 340, and the present invention detects and tracks the hand movement 381 of the shopper. If the coordinate, i.e., (Xi, Yi, Ti) 442, of the person stays in one of the bounding boxes for longer than a threshold time, the present invention increases the interaction count of the category that is associated with the particular bounding box.

The purchase detection 249 process can utilize a background subtraction algorithm in the bounding boxes to detect the presence and absence of the product belonging to a category. When a product's absence is detected, the purchase count is increased for the particular product category. In addition, a semi-automatic annotation method can also be used for this process.

Figure 5:
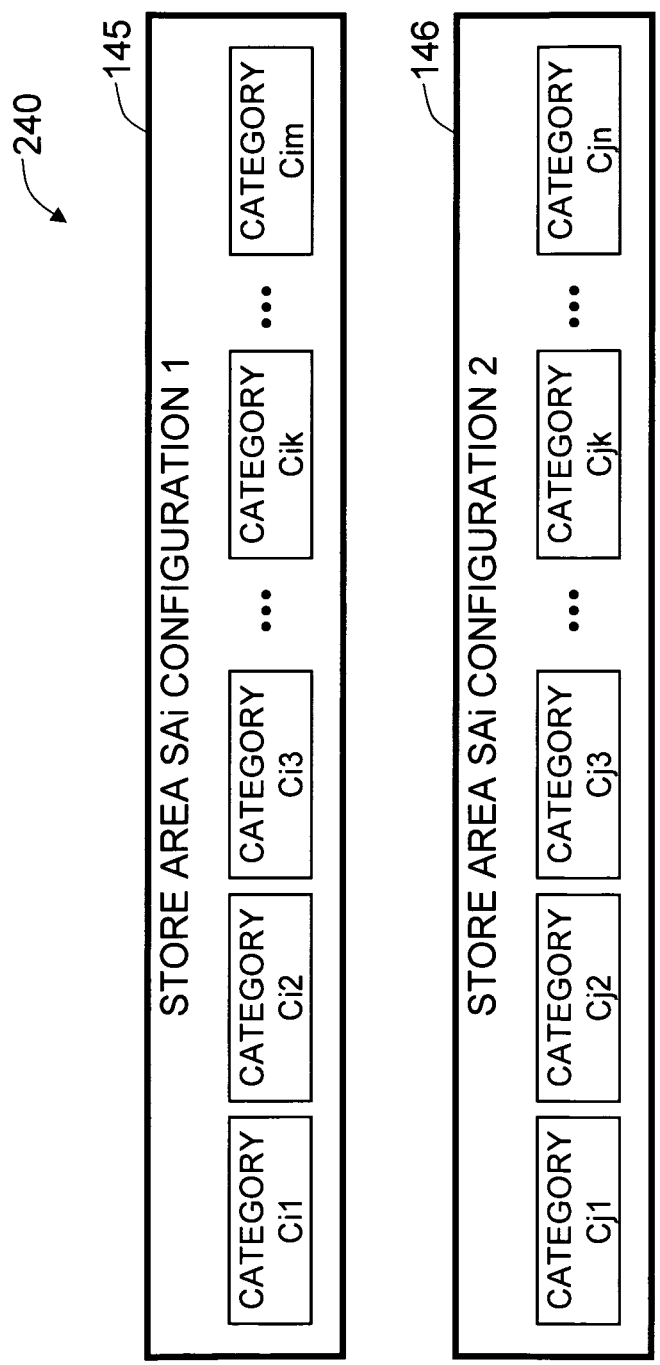
FIG. 5 shows an exemplary comparison process of two different store area configurations with different member categories with regard to a store area.

FIG. 5 shows an exemplary comparison process of two different store area configurations with different member categories with regard to a store area.

In order to measure category strength, the present invention has various types of comparison between the different store area configurations 240, e.g., "store area SAi configuration 1" 145 and "store area SAi configuration 2" 146. A store area consists of one or more product categories. The composition of the categories can be changed from a category composition, e.g., the categories in "store area SAi configuration 1" 145, to another, e.g., the categories in "store area SAi configuration 2" 146. In different configurations for the group of categories, a subset of the member categories can be changed. The overall performance of a store area can be calculated by aggregating the performance measurements of the member categories. By comparing the overall store area performances, the present invention can produce information about which configuration, i.e., a group of member categories, performs best for a store area.

Figure 6:
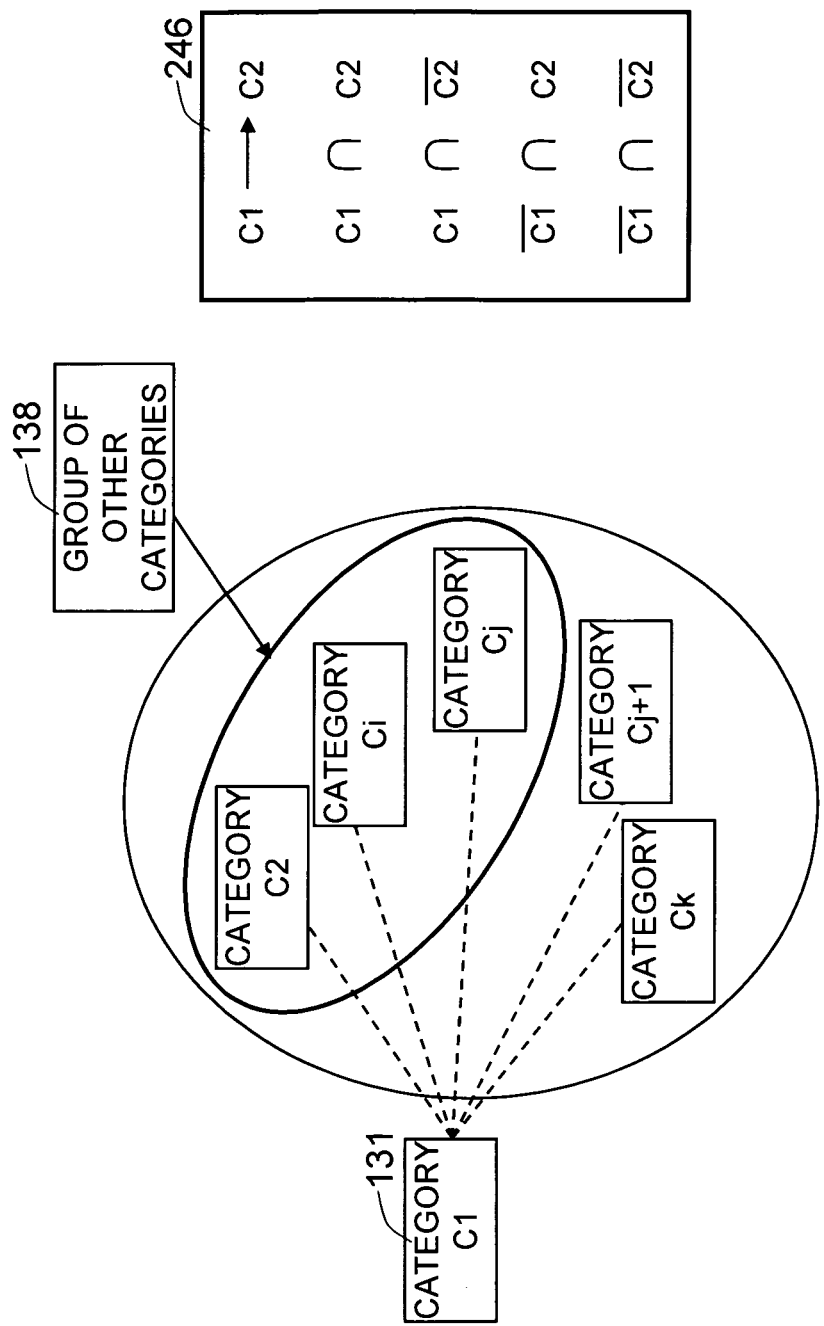
FIG. 6 shows an exemplary process of measuring the performance of a category along with other categories in a store area.

FIG. 6 shows an exemplary process of measuring the performance of a category along with other categories in a store area.

Comparing conversion rates along various stages of a shopper interaction funnel in relation to a category along with associated other categories is one of the ways to measure the performance of categories. Percentages for various indices are calculated.

In the exemplary embodiment shown in FIG. 6, a target category, i.e., "category 1" 131, can be coupled with a group of other categories 138 in a store area to analyze an optimal result with regard to the assortment, allocation, and adjacency analysis. The category analysis 246 shows an exemplary method for analyzing the relationship between two categories based on a Boolean logic. For example, the number of customers who shopped both category C1 and C2 can be counted in the allocation analysis. In another example, the "if then else" relationship can be used to analyze the sequence relationship among the categories. For example, if a shopper shops at category C1 and then category C2, the count for the sequence from C1 to C2 is increased.

FIG. 7 shows a first exemplary table for measurement count and a first exemplary table for conversion ratio based on the first measurement count table, where the tables are used to measure the strength of a category.

In the "first exemplary table for measurement count" 621, the row indices, i.e., "EX1," "EX2," "EX3," "EN1," "EN2," "EN3," "P1," "P2," and "P3," indicate an exemplary level of interaction between the people and the category. The column indices, i.e., "DEMO CLASS 1," "DEMO CLASS 2," "DEMO CLASS 3," and "TOT," indicate exemplary classes of demographic groups and a total number of people in all demographic groups with regard to the category, i.e., "CATEGORY Cp." Therefore, the values in the first three columns in the table indicate the number of people at each level of interaction according to the demographic class to which the people belong, and the values in the last column in the table indicate the total number of people in all demographic groups at each level of interaction.

In the "first exemplary table for conversion ratio" 622, the row indices, i.e., "CR1" through "CR8," indicate the conversion ratio of the measurement count from an interaction level to the next interaction level, based on the first measurement count table. For example, the "CR1" indicates the conversion ratio from the interaction level "EX1" to the next interaction level "EX2," the "CR2" indicates the conversion ratio from the interaction level "EX2" to the next interaction level "EX3," and so on. The column indices, i.e., "C1," "C2," "C3," and "TOT," indicate exemplary classes of demographic groups and a total number of people in all demographic groups with regard to the category, similar to the first measurement count table. Therefore, the values in the first three columns in this table indicate the conversion ratio of the measurement count from one interaction level to the next interaction level according to the demographic class to which the people belong. The values in the last column in this table indicate the conversion ratio of the measurement count for the total number of people in all demographic groups at each level of interaction. Also, in another exemplary measurement, the values in the first three columns in this table can be made to indicate the conversion ratio of the measurement count from the first initial interaction level to each interaction level.

The tables are generated by the processes of the path analysis 470 and the behavior analysis 480 in association with the demographic classification 814 in the present invention.

FIG. 8 shows a second exemplary table for measurement count and a second exemplary table for conversion ratio based on the second measurement count table, where the tables are used to measure the strength of another category.

The row indices, column indices, and values of the "second exemplary table for measurement count" 623 are indicated as the same as those of the "first exemplary table for measurement count" 621 in FIG. 7, respectively. Likewise, the row indices, column indices, and values of the "second exemplary table for conversion ratio" 624 are indicated as the same as those of the "first exemplary table for conversion ratio" 622 above, respectively.

The tables are also generated by the processes of the path analysis 470 and the behavior analysis 480 in association with the demographic classification 814 in the present invention with regard to "CATEGORY Cq," where "CATEGORY Cq" is one of the other exemplary categories in the same store area as that of "CATEGORY Cp".

The category strength rating 280 process in the present invention compares the tables and decides how much better the target category, i.e., "CATEGORY Cp", impacted the people compared to other categories in a store area.

For example, the "second exemplary table for measurement count" 623 and the "second exemplary table for conversion ratio" 624 for the "CATEGORY Cq" show the people from the "DEMO CLASS 2" and "DEMO CLASS 3" with a larger decrease in the overall purchase conversion rate than that of the "first exemplary table for measurement count" 621 and the "first exemplary table for conversion ratio" 622 for the "CATEGORY Cp."

Particularly, the conversion ratio at row "CR3" and column "C2" in the "second exemplary table for conversion ratio" 624 for the "CATEGORY Cq" shows that the people in the "DEMO CLASS 2" group converted from the exposure level of interaction to the engagement level of interaction at a much lower rate compared to the comparable conversion ratios of other demographic groups, while the people in "DEMO CLASS 2" group in the "CATEGORY Cp" do not show such a significant reduction. This data indicates that the "CATEGORY Cq" has less effectiveness or strength with regard to the interaction between the people in the "DEMO CLASS 2" group and the category compared to the target category, "CATEGORY Cp."

Likewise, other meaningful analyses can be made based on the comparisons of the data in the tables, such as the comparison between the two conversion ratios at row "CR6" and column "C2" and at row "CR6" and column "C3" in the "second exemplary table for conversion ratio" 624 for the "CATEGORY Cq" and the other two conversion ratios at row "CR6" and column "C2" and at row "CR6" and column "C3" in the "first exemplary table for conversion ratio" 622 for the "CATEGORY Cp."

Figure 9:
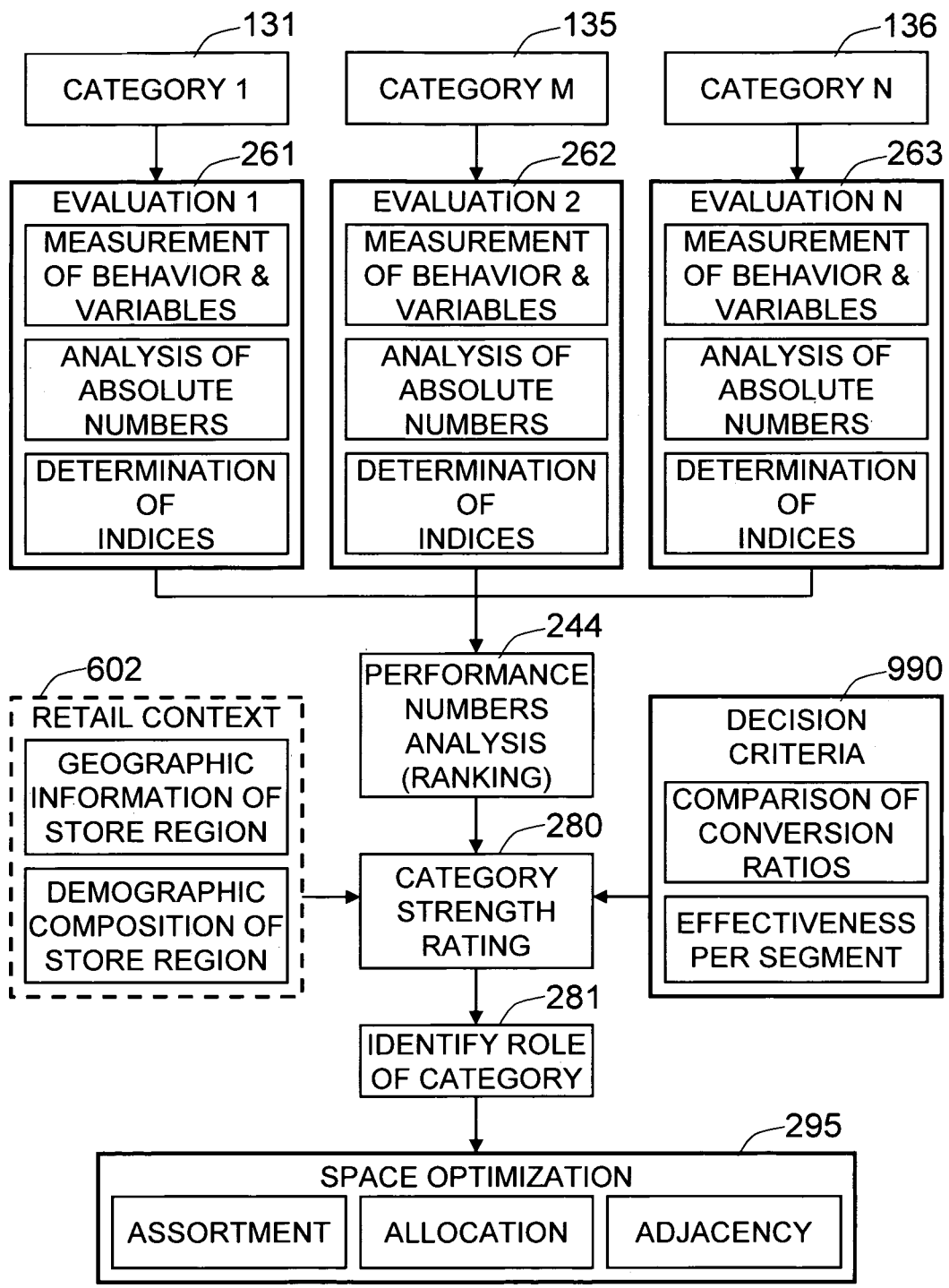
FIG. 9 shows detailed processes for an exemplary category strength measurement.

FIG. 9 shows detailed processes for an exemplary category strength measurement.

In the exemplary embodiment shown in FIG. 9, once the categories, e.g., "category 1" 131, "category M" 135, and "category N" 136, in a store area that are measured for the strength are identified, the evaluation process, e.g., "evaluation 1" 261, "evaluation 2" 262, and "evaluation N" 263, begins measuring the behavior patterns, demographics, impression, emotion change, and other key variables. In each evaluation process for the categories, the present invention measures the variables along each stage of the shopper interaction funnel, analyzes the absolute number of the shopper interactions, and determines indices that indicate the performance of each category. The measurements for categories are analyzed 244 to determine the category strength rating 280, based on the category strength decision criteria 990. One exemplary analysis is to compare the categories with each other along several measurements, and rank them. The category strength decision criteria 990 can comprise a comparison of the conversion ratio among the indices along each stage of the shopper interaction funnel and effectiveness count per shopper segment. The comparison along multiple measurements provides a performance score for each category, indicating the ability to drive desired shopper behavior.

In an exemplary embodiment, the present invention can optionally handle the information in a retail context 602 for determining the category strength rating 280. Contextual information can affect how the category performs, i.e., how the category influences the shopper behavior in a category. If there exist other parameters in a retail context 602 that could skew the output of the measurement, the present invention can minimize the effects of the parameters by normalizing the calculation. For example, a weighted value of the parameters can be subtracted from the traffic count for a category.

The category strength measurement in the retail context 602 also shows the correlation between the contextual information and the category performance. The retail context in the present invention could comprise a promotion schedule, temporal information such as time of year, and geographic information such as geographic information specific to the store region where the store is located, and demographic composition of the store region.

The category strength rating 280 provides information to identify 281 the role of each category or a group of categories in a store area, in such a way that the present invention knows which category or group of categories performs better in a measured store area. The ratings, along with the identification of the category roles, are used to optimize 295 the space usage of a store area.

Figure 10:
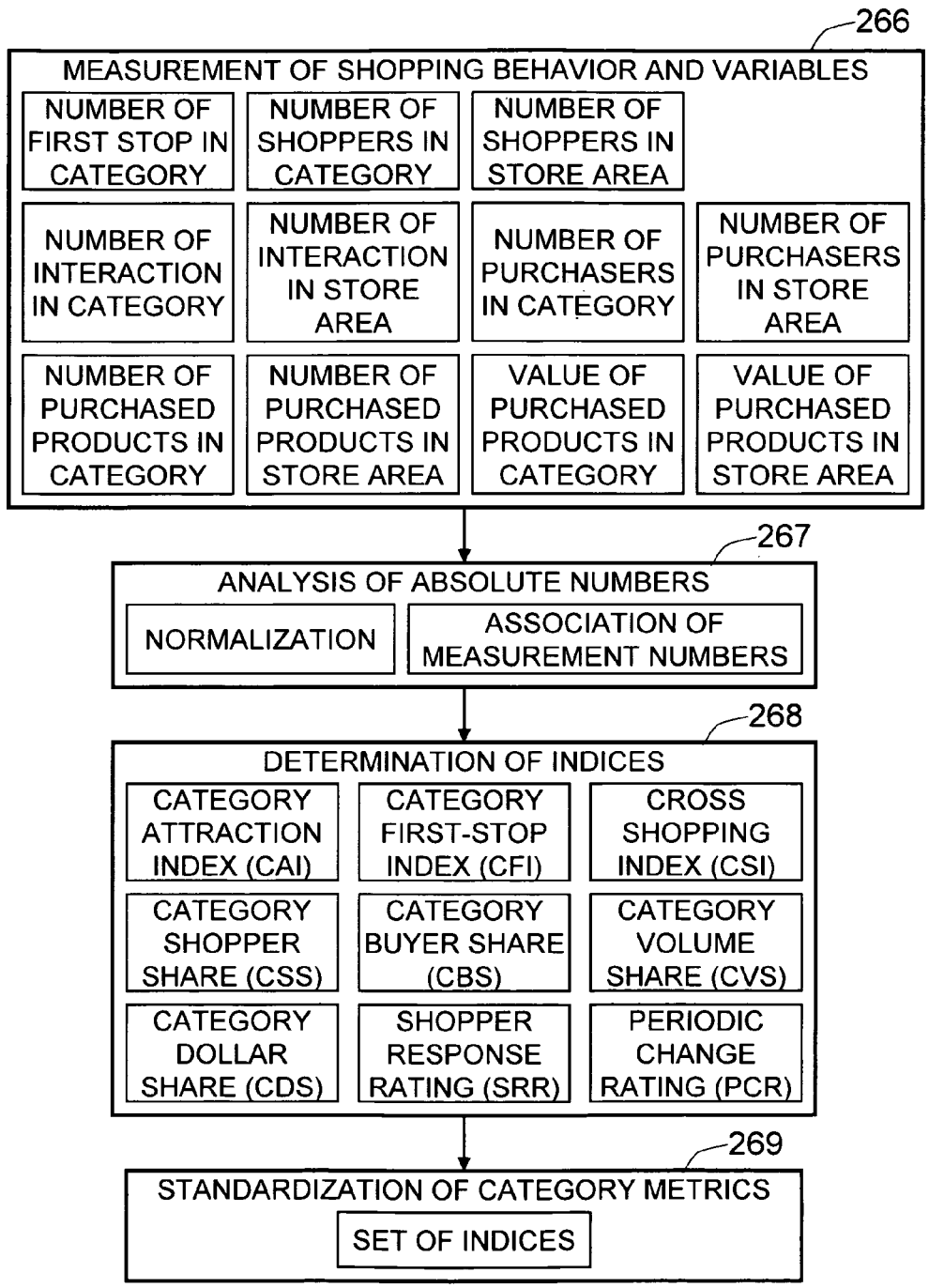
FIG. 10 shows an exemplary process of evaluating indices for the category strength measurement.

FIG. 10 shows an exemplary process of evaluating indices for the category strength measurement.

Various indices are measured with respect to observable shopping behaviors.

First, shopping behavior and key variables are measured 266. The shopping behavior and key variables include, but are not limited to, the number of first-stops in a category, the number of shoppers in a category, the number of shoppers in a store area, the number of interactions in a category, the number of interactions in a store area, the number of purchasers in a category, the number of purchasers in a store area, the number of purchased products in a category, the number of purchased products in a store area, the value of purchased products in a category, and the value of purchased products in a store area.

The measured numbers are normalized before an analysis. The analysis of measured absolute numbers 267 includes association of measurement numbers. For example, the measurement numbers are associated with temporal attributes, so that the measurements that were processed during the same window of time will have the same time-stamps and are logically grouped together.

Based on the normalized numbers, various indices are determined 268 at the next step. The indices comprise a category attraction index, a category first-stop index, a cross-shopping index, a category shopper share, a category buyer share, a category volume share, a category dollar share, a shopper response rating, and a periodic change rating. Each index is measured for a given period, for example, a week or a month. A subset of the indices can be grouped depending on the applications. Each behavior is measured for a given period, for example, a week. The calculated indices are standardized 269 based on predefined standards of category metrics, so that the indices can be utilized across multiple store areas.

The indices comprise the following:

1) Category attraction index (CAI):

$$CAI_i = \frac{NumOfShoppers(FirstStop(Category_i))}{NumOfShoppers(StoreArea_i)} \qquad (1)$$

where $CAI_i$ is the first-stop or destination index for a category, i.e., category i, "NumOfShoppers (FirstStop (Category i))" is the number of shoppers first-stopping in front of a category, i.e., category i, "NumOfShoppers (Store Area i)" is the number of shoppers in a store area, i.e., store area i, and the number of shoppers in a category is the number of shoppers who stopped in a store area at least once.

2) Category first-stop index (CFI):

$$CFI_i = \frac{NumOfShoppers(FirstStop(Category_i))}{NumOfShoppers(Category_i)} \qquad (2)$$

where $CFI_i$ is the first-stop or destination index for a category, i.e., category i, "NumOfShoppers (FirstStop (Category i))" is the number of shoppers first-stopping in front of a category, i.e., category i, "NumOfShoppers (Category i)" is the number of shoppers in a category, i.e., category i, and the number of shoppers in a category is the number of shoppers who stopped in a category at least once regardless of first-stopping.

3) Cross-shopping index (CSI):

$$CSI_i = \frac{NumOfShoppers(Category_i, Category_j)}{NumOfShoppers(Category_i)} \qquad (3)$$

where CSIi is the cross-shopping index for a category, i.e., category i, "NumOfShoppers (Category i, Category j)" is the number of shoppers who shopped in a category, i.e., category i, and at least one more category, i.e., category j, in a store area, and "NumOfShoppers (Category i)" is the number of shoppers in the category i. The CSIi can be used by retailers to determine which categories should be collocated in a store area.

4) Category shopper share (CSS):

$$CSS_i = \frac{NumOfShoppers(Interact(Category_i))}{NumOfShoppers(Interact(Category_n(StoreArea_i)))} \qquad (4)$$

where $CSS_i$ is the category shopper share for a category, i.e., category i, "NumOfShoppers (Interact (Category i))" is the number of shoppers who interacted with a category, i.e., category i, "NumOfShoppers (Interact (Category n(Store Area i)))" is the number of shoppers who interacted with any category in a store area, i.e., store area i, and the interaction is defined as visual or physical interaction.

5) Category buyer share (CBS):

$$CBS_i = \frac{NumOfShoppers(Buy(Category_i))}{NumOfShoppers(Buy(StoreArea_i))} \qquad (5)$$

where $CBS_i$ is a category buyer share index for a category, i.e., category i, "NumOfShoppers (Buy (Category i))" is the number of shoppers who bought one or more product units from a category, i.e. category i, and "NumOfShoppers (Buy (Store Area i))" is the number of shoppers who bought one or more product units from a store area, i.e., store area i.

6) Category volume share (CVS):

$$CVS_i = \frac{NumOfProducts(Category_i)}{NumOfProducts(StoreArea_i)} \qquad (6)$$

where $CVS_i$ is the category volume share for a category, i.e., category i, "NumOfProducts (Category I)" is the number of units of products bought from a category, i.e., category i, and "NumOfProducts (Store Area i)" is the number of units of products bought from a store area, i.e., store area i.

7) Category dollar share (CDS):

$$CDS_i = \frac{ValueOfProducts(Category_i)}{ValueOfProducts(StoreArea_i)} \qquad (7)$$

where $CDS_i$ is the category dollar share for a category, i.e., category i, "ValueOfProducts (Category i)" is the dollar value of products bought from a category, i.e., category i, and "ValueOfProducts (Store Area i)" is the dollar value of products bought from a store area, i.e., store area i.

8) Shopper response rating (SRR):

$$SRR_i = \frac{\frac{ValueOfProducts(Category_i)}{NumOfShoppers(Category_i)}}{\frac{ValueOfProducts(StoreArea_i)}{NumOfShoppers(StoreArea_i)}} \qquad (8)$$

where $SRR_i$ is the shopper response rating for a category, i.e., category i, "ValueOfProducts (Category i)" is the dollar value of products bought from a category, i.e., category i, "NumOfShoppers (Category i)" is the number of shoppers for a category, i.e., category i, "ValueOfProducts (Store Area i)" is the dollar value of products bought from a store area, i.e., store area i, and "NumOfShoppers (Store Area i)" is the number of shoppers in a store area, i.e., store area i, and SRR=1 means ability of a category to produce a dollar is the same as the average for a store area, SRR>1 means category is stronger than a store area average, and SRR<1 means category is weaker than a store area average. The SRR of different categories in a store area can be used for ranking the categories and can be used by a retailer to decide which categories to carry or remove and to allocate different space in a store area.

9) Periodic change rating (PCR):

$$PCR_i = \frac{\Delta(Idx_{T1}(Category_i), Idx_{T2}(Category_i))}{\Delta(Performance_{Ti}(StoreArea_i), Performance_{T2}(StoreArea_i))} \quad (9)$$

where $PCR_i$ is the periodic change rating for a category, i.e., category i, "$\Delta(Idx_{Ti}(Categoty_i), Idx_{T2}(Category_i))$" is the change of the index values for a category, i.e., category i, during the time period from T1 to T2, and "$\Delta(Performance_{Ti}(StoreArea_i), Performance_{T2}(StoreArea_i))$" is the change of the performance values of a store area, i.e., store area i, during the time period from T1 to T2.

The index, Idx i, can be one of the indices above, and the PCR shows the relative change for the category as a ratio of the relative change of values in a store area that reflect how a performance parameter changes ($\Delta$) for a category in relation to that of the other categories during a period, such as two consecutive weeks or the same week from two consecutive years.

In addition to the above measurements, the present invention can also further determine different types of detailed behaviors exhibited in a category. The types of behavior include shopper trip velocity and pickup interaction. Such granular understanding of the behaviors in a category will help to determine its effectiveness in a clear and concise manner.

Figure 11:
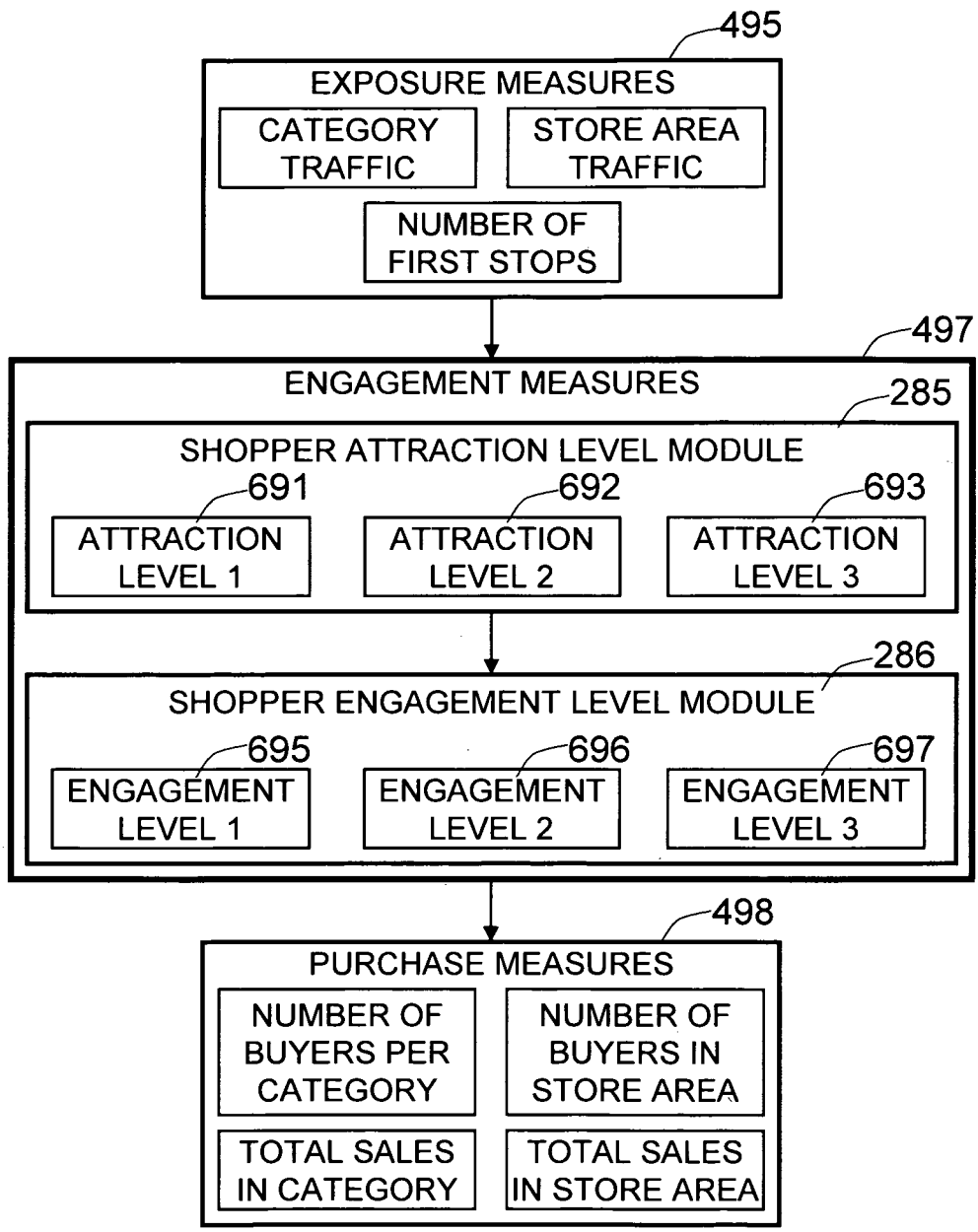
FIG. 11 shows exemplary measurement of shopper response and datasets along the customer interaction stage in one of the preferred embodiments of the invention.

FIG. 11 shows exemplary measurement of shopper response and datasets along the customer interaction stage in one of the preferred embodiments of the invention.

In an exemplary embodiment of the present invention, shopper responses to the categories and the ratings can be calculated and categorized along a shopper interaction funnel model, which comprises layers for exposure measures, engagement measures, and purchase measures.

A funnel model is a model for interaction or engagement level of shoppers with the product, product category, or media content in the present invention. The model comprises multiple layers that represent different level of interaction or engagement of the people. For example, the layers can represent "traffic", "attraction", "engagement", and "purchase", from the lowest layer to the highest layer in the funnel model. In this approach, the conversion rates between each interaction/engagement level in the funnel model are correlated with the category performance. For example, among the categories, a better performing category can be selected by comparing the conversion rates of the interaction/engagement with the product category.

In an exemplary embodiment, the present invention can identify key measurement numbers, such as traffic count, along various interaction stages of the person in each category, e.g., with a set of products in the category, and measure various indices. For example, the present invention can count the exposure measures 495, such as the traffic in the vicinity of the target category, i.e., category traffic 682. This identifies the ability of the category and its products to reach shoppers for influencing them to the later stages, such as engagement and purchase.

The present invention also identifies the ability of the category to engage with shoppers at the engagement measures 497, whose exemplary substages can comprise attraction level and engagement level. The attraction level itself can have various sublevels—ranging from glancing at the products of the category to briefly noticing them and to noticing them for an extended time period. For example, the shopper attraction-level module 285 determines the attraction level of shoppers based on predefined criteria, i.e., "attraction level 1" 691, "attraction level 2" 692, and "attraction level 3" 693. In the example, the "attraction level 1" 691 can represent those shoppers that glanced at the products in a target category between two predefined thresholds:

Attraction Level
   1:Threshold1 ≤ ViewingTime < Threshold2    (10)

Likewise, "attraction level 2" 692 can represent those shoppers that briefly noticed the products in the category for a predefined time period, such as greater than or equal to "Threshold 2" and less than "Threshold 3", and "attraction level 3" 693 can represent those shoppers that noticed the products in the category for extended periods, such as greater than or equal to "Threshold 3" and less than "Threshold 4", where the thresholds are predefined by the owner of an embodiment of the present invention.

The decision process in the shopper attraction-level module 285 utilizes the spatial and temporal data produced by the video-based analysis of the shoppers. For example, if a shopper's track stays at a location, Loc(Xi, Yi), within a bounding box in the vicinity of a category for a longer threshold of time "Th1" but less than or equal to another threshold "Th2" of time, the activity can be identified as belonging to one of the attraction-level categories, based on the predefined values for the thresholds "Th1" and "Th2." The details of the behavior analysis based on the spatial and temporal attributes of the person tracking can be found in U.S. Pat. No. 8,009,863 of Sharma, et al. (hereinafter Sharma U.S. Pat. No. 8,009,863).

Further, the present invention evaluates the engagement process of the person with each category in granular details. The granular detail analysis involves evaluating the physical interaction of shoppers with the category, like reading labels, comparing products, comparing package sizes, and sniffing products.

For example, the shopper engagement-level module 286 makes a decision for the engagement level of shoppers based on predefined criteria for the engagement levels, i.e., "engagement level 1" 695, "engagement level 2" 696, and "engagement level 3" 697, in response to the products in a category. In the example, "engagement level 1" 695 can represent shoppers' behavior of touching the products, "engagement level 2" 696 can represent shoppers' behavior of reading the labels or category logos on the products, and "engagement level 3" 697 can represent shoppers' behavior of comparing categories.

The decision process in the shopper engagement-level module 286 can also utilize the spatial and temporal data produced by the video-based analysis of the shoppers in a similar way as the decision process of the shopper attraction-level module 285 discussed above. However, for complex engagement activities, the decision process in the shopper engagement-level module 286 can utilize the semi-automatic data measurement 234 and analysis for interaction, where a manual annotation tool may be used in an exemplary embodiment.

Finally, the present invention will identify the number of buyers 661 per category that make a purchase and total sales 662 in the category at the purchase measures 498 stage. Examples of the purchase include an activity of putting a product in a cart or a shopping basket.

Figure 12:
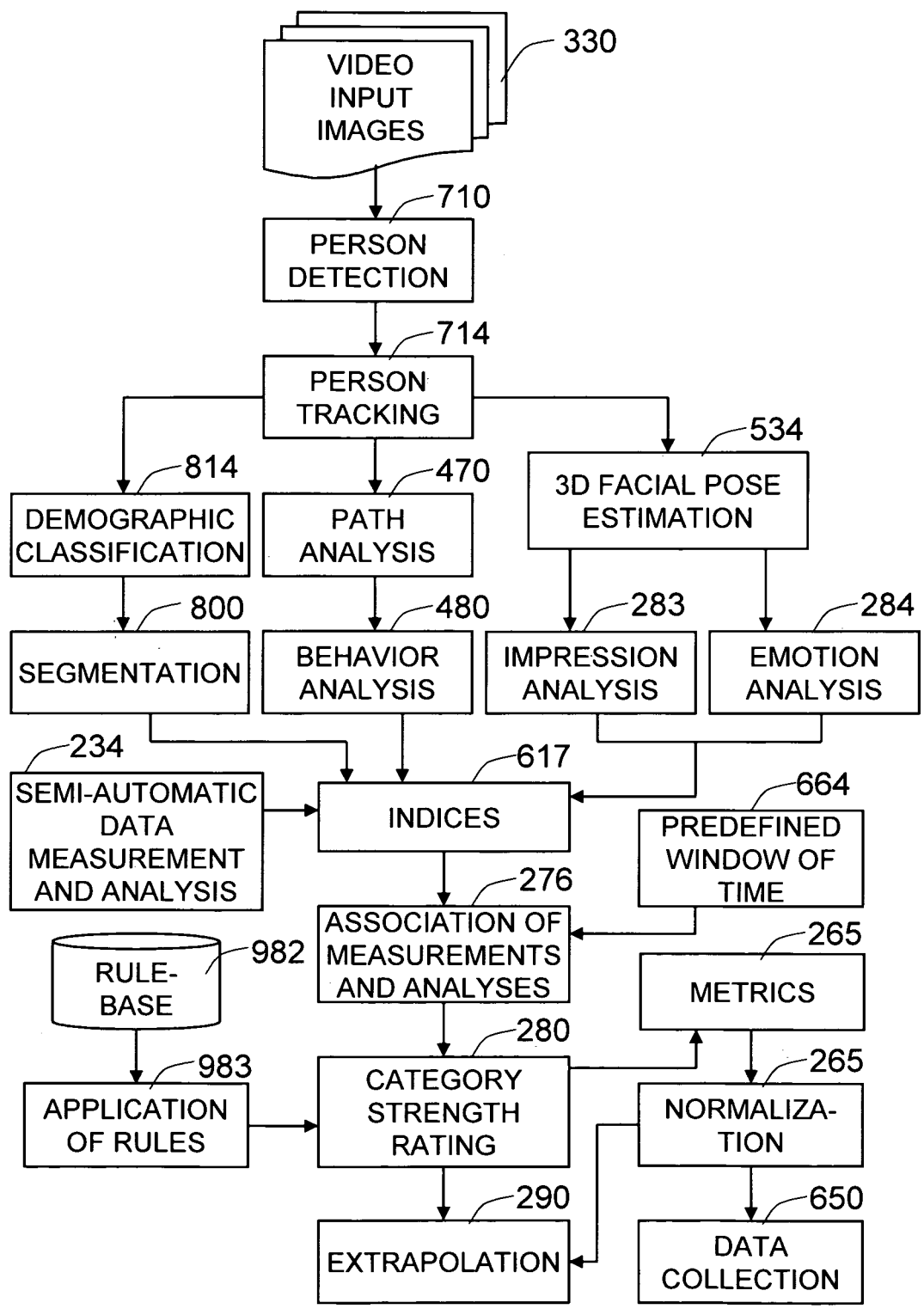
FIG. 12 shows exemplary processes for the measurement of people's responses to a target category, in which computer vision-based behavior analysis and segmentation measurement, i.e., demographics measurement, impression analysis, and emotion analysis, are associated in an exemplary embodiment of the invention.

FIG. 12 shows exemplary processes for the measurement of people's responses to a target category, in which computer vision-based behavior analysis and segmentation measurement, i.e., demographics measurement, impression analysis, and emotion analysis, are associated in an exemplary embodiment of the invention.

The present invention comprises modules of:
automatic behavior measurement and analysis,
automatic demographics measurement and analysis,
impression analysis,
emotion change measurement and analysis,
semi-automatic data measurement and analysis, and
a module for associating the measurements and analyses, and processing a performance numbers comparison.

The present invention identifies high-level numbers along various interaction stages of the person for the category or the group of categories that are measured for the performance level in a store area. The variables can include behavioral measurement and segment information, such as demographics.

The present invention calculates specific indices 617 based on the variables to determine the performance of each category in a store area. The indices 617 can comprise a reach to attract index, attract to engage index, and engage to motivate index. Then, the present invention compares the measurements for a target category vs. other categories in a store area or overall performance of various groups of categories in a store area in different times.

For example, the present invention can compare the conversion ratios of people for the target category vs. other categories in the category. Higher conversions of shoppers along various stages for the target category than the conversions of other categories indicate that the target category is relatively more effective in influencing shoppers in that category as compared to the other categories. The conversions of categories are ranked, and a subset of the higher performing categories can be selected for a store area optimization. In another exemplary embodiment, the present invention can also measure overall performances of various groups of categories in a store area in different times. Then, the measures are compared to find the best performing group of categories for a store area. In the exemplary embodiments, the present invention can produce at least a table for the indices.

Furthermore, the present invention measures the effectiveness in relation to each demographic segment. Demographic segmentation can be used to identify the impact of a category on specific shopper segments. In an exemplary embodiment, the present invention produces comparison results of the index matrices or tables in relation to demographic segmentation.

In a preferred embodiment, the present invention processes the video-based analysis automatically. However, in another exemplary embodiment, the present invention can process the video-based analysis semi-automatically 234, where a semi-automatic annotation tool is used in combination with automatic behavior analysis, demographic analysis, impression analysis, and emotion change detection. The present invention can utilize an efficient video annotation tool, such as that disclosed in U.S. patent application Ser. No. 12/011,385 of Sharma, et al. (hereinafter Sharma Ser. No. 12/011,385) as the semi-automatic annotation tool.

The present invention can organize the measurement of the response to the category based on the segmentation and trip type analysis of the people. The segmentation comprises demographic segments, including age range, gender, and ethnicity. The trip type includes shopping patterns of the people.

Further, the present invention can evaluate the engagement process of the person with each category in granular detail in an exemplary embodiment. The granular detail comprises the behavior of reading labels, comparing products, sniffing products, and other physical interactions with the products in the category.

In the exemplary embodiment shown in FIG. 12, the present invention detects 710 and tracks 714 a person, such as a customer, in the video input images 330, from a plurality of means for capturing images 100. The present invention can join the trajectories of the person tracks from a video of a means for capturing images 100 to another video of a means for capturing images 100 while the person appears and disappears between the fields-of-view among a plurality of means for capturing images 100. Based on the tracking information, the present invention performs the path analysis 470 of the particular person. The path analysis 470 can be used as one of the ways to process the behavior analysis 480 of a person and obtain useful information about the person's behavior, such as engagement behavior with the category.

The present invention can utilize any reliable video-based tracking method for a single customer and a group of customers in the prior art, in regard to the behavior analysis. For example, Sharma U.S. Pat. No. 8,009,863 disclosed an exemplary process of video-based tracking and behavior analysis for people in a physical space based on the information for the trip of the people, using multiple means for capturing images in a preferred embodiment of the invention.

The present invention can also process segmentation 800 of the people, based on the images of the people in the video. Demographic classification 814 is an exemplary segmentation 800 of the people.

The present invention can utilize any reliable demographic composition measurement method in the prior art as an exemplary video-based segmentation of the people. For example, U.S. patent application Ser. No. 11/805,321 filed on May 23, 2007 of Sharma, et al., (hereinafter Sharma Ser. No. 11/805, 321) disclosed an exemplary demographic composition measurement based on gender and ethnicity.

The segmentation 800 and behavior analysis 480 data are used to produce indices 617, and the indices 617 are sent to the module for the association of measurements and analyses 276, which calculates the category strength rating 280.

Impression analysis 283 and emotion analysis 284 are carried on images of the people to measure the impact of the category on the people in fine detail.

The impression measurement module counts and measures the impression length. The impression measurement module can also process a deeper impression analysis in correlation with other parameters, such as the duration of viewing time for a particular category per demographic segmentation. With regard to the impression count and measurement, the present invention can utilize any well-known impression measurement method. U.S. patent application Ser. No. 11/818,554 filed on Jun. 14, 2007 of Sharma, et al., (hereinafter Sharma Ser. No. 11/818,554) disclosed details of a system for measuring the impression level through the viewership of people. An exemplary embodiment of the present invention shown in FIG. 12 can utilize Sharma Ser. No. 11/818,554 for the impression measurement in the impression analysis 283, especially utilizing the 3D facial pose estimation 534.

The impression analysis 283 and emotion analysis 284 measurements are very important for understanding the impact of the category on the people who were exposed to it. The measurements can teach us to understand whether the products in the category were engaging enough to hold the attention of the people, and whether the product category produced the desired emotional change in the people.

In an exemplary embodiment, the impression analysis 283 module can utilize other variables to measure the deeper level of impression. The other variables can comprise the relationship of the category with the surrounding categories, demographic segmentation, and temporal attributes.

For example, a more than average number of impression counts for a category in relation to a specific demographic group indicates that the category was able to attract and engage the specific demographic group in a particularly meaningful pattern. Likewise, the impression count data can be analyzed to measure the impact to each predefined demographic group in relation to the particular category. Each metric gives a measure of response to the category as a whole and individual graphics. A category that can attract more people and engage them longer can be considered better than the other categories that do not.

The emotion analysis 284 module measures the emotional response people have to a given category. Whenever a person engages with products in a product category, his or her facial expression could change in reaction to the products in the category.

Usually the goal of the elements in the category is to entice a positive and happy response. The degree (valance) by which a person reacts to a category will be measured using vision-based technologies. A set of video input images 330 is provided to the emotional change detection sub-module that measures the magnitude of the emotional change.

This reaction is defined as the persuasiveness of the category. The average of all emotional reactions to a category can be considered as the unified emotional response to the category. The following equation gives an exemplary way to, calculate persuasiveness.

$$\text{persuasiveness} = \frac{k}{\text{Total\_impressions}} \sum_{n=1}^{k} \partial \text{emotion}_n \qquad (11)$$

Where k is the total number of impressions that had an emotional response to the category $\partial \text{emotion}_n$ is the change in response associated with the nth impression.

Several approaches exist for analyzing static images of faces to track the expressions and estimate the emotional state of a person. For example, J. F. Cohn, A.

J. Zlochower, J. Lien, and T. Kanade, "Automated face analysis by feature point tracking has high concurrent validity with manual FACS coding," Psychophysiology, pp. 35-43 1999 (hereinafter Cohn), focus on classification of static images of the face, which are associated with expression of particular emotions. Several approaches have also been reported for analyzing a sequence of images for facial expression analysis and estimating the emotional state of a person. For example, I. A. Essa and A. P. Pentland, "Facial expression recognition using a dynamic model and motion energy," presented at International Conference on Computer Vision, June 1995 (hereinafter Essa) disclosed an automated system for facial expression detection using optical flow coupled with a physical model of face muscles to describe the facial motions, and Y. Yacoob and L. S. Davis, "Recognizing Human Facial Expression," University of Maryland, Technical Report CS-TR-3265, May 1994, (hereinafter Yacoob) followed a three-level recognition approach based on the optical flow of points with high gradient values. The above methods aim at classifying low-level facial expressions into FACS type Action Units (AUs).

The present invention can utilize an approach for measuring the change in emotion in response to a category from an analysis of the change of the facial expression, as suggested in Cohn and Essa. Specifically, the present invention can detect a positive or negative change in the "valence" of the emotion so that it can be used as a measure of persuasiveness of the category.

The measured data can be stored in a database at the data collection process 650. The analysis of the measured data can be further facilitated by applying 983 a set of predefined rules in a rule base 982.

Rule Application Logic Module

In the present invention, the analysis of the measured data can be further facilitated by applying 983 a set of predefined rules for the category strength rating in a rule base 982 through a rule application logic module. The rule application logic module can enable a dynamic rule application rather than relying on an ad hoc solution or static hard-code in translating the measured data.

An exemplary rule application logic module can be implemented utilizing the information unit verification technologies in U.S. Pat. No. 7,904,477 of Jung, et al. (hereinafter Jung).

The rule application logic module enables the adjustment in the analysis and extraction of characteristic information to be done in a structured and dynamic way. The exemplary parameter models, such as the analysis formula and statistical model, can be dynamically adjusted based on the rule application logic module.

In an exemplary embodiment, the rule application logic module constructs a characteristic information extraction criteria based on a set of predefined rules. The rule application logic module can further construct the criteria based on a combination of a set of predefined rules, in which the analysis of the data can be performed in further detail. The rule application logic module can further define domain-specific criteria for the category strength rating.

The rule application logic module can facilitate the process of producing a unified and standardized category strength rating, by normalizing the variance within the predefined thresholds. For example, if a measurement for a category is skewed due to less desirable environmental factors, the differences can be adjusted by applying normalization offset values to the differences within predefined thresholds using the rule application logic module. Then, the analysis can take this into consideration at the final analysis of the category strength rating.

The application of the rule application logic module can differentiate the levels of measurement and analysis of the category strength rating, where a first set of criteria are applied throughout the preliminary data, and a second set of criteria are applied to the next level of data for a complicated analysis, in order to serve specific needs of the complicated analysis. An exemplary first set of criteria can typically comprise common criteria throughout all of the categories, and the second set of criteria is typically different from the first set of criteria.

FIG. 13 shows an exemplary network of a plurality of means for control and processing and a plurality of means for capturing images in the present invention for category strength rating, where the network consists of a plurality of first means for control and processing and a plurality of second means for control and processing, which communicate with each other to synchronize the time-stamped lists of measurement among a plurality of video streams captured by the means for capturing images in the measured locations.

The present invention is also an apparatus for rating the role of a product category in the performance of a store area based on the measurement of a set of shopper behavior metrics. The apparatus comprises means for capturing a plurality of input images of people by at least a means for capturing images, e.g., first means for capturing images 101 and second means for capturing images 102, in a store area, means for processing the plurality of input images, e.g. first means for control and processing 107 or second means for control and processing 108, in order to analyze the behavior of the people. The apparatus also comprises means for measuring the response of the people tied to the category based on the behavior analysis, and means for creating a plurality of datasets by accumulating the response measurement. The first means for control and processing 107 or second means for control and processing 108 may be used as the exemplary embodiment of these means.

In the exemplary embodiment, a plurality of means for capturing images, i.e., a plurality of first means for capturing images 101, are connected to the means for video interface in a first means for control and processing 107.

The sensors are placed in a distributed architecture to facilitate the measurement of the response data. If the distance between the plurality of means for capturing images is greater than a means for control and processing can handle, e.g., in order to cover the multiple areas for multiple category strength ratings in multiple categories that are located far from each other, the plurality of means for capturing images can be connected to multiple means for video interface.

For example, in the exemplary embodiment shown in FIG. 13, a plurality of first means for capturing images 101, such as a "means for capturing images 1" 111 and a "means for capturing images 2" 112, are connected to the means for video interface in a first means for control and processing 107 that is different from the first means for control and processing 107 of another plurality of first means for capturing images 101, such as a "means for capturing images 5" 115 and a "means for capturing images 6" 116. The plurality of means for control and processing can be connected in a local area network and communicate with each other.

In an exemplary deployment of the system that embodies the present invention, the first means for capturing images 101 can be installed where the field-of-view can cover the traffic of the people in the measured location and the second means for capturing images 102 can be installed in the vicinity of a category in the location for the close view of the people. The means for capturing images are connected to the means for video interface through cables.

The digitized video data from the means for video interface is transferred to the means for control and processing that executes computer vision algorithms on the data. The means for control and processing can have internal means for storing data or external means for storing data.

The means for capturing images can comprise an analog camera, USB camera, or Firewire camera. The means for video interface, which can comprise a video frame grabber, USB interface, or Firewire interface, are typically included in the same enclosure as the means for control and processing.

The means for control and processing can be a general purpose personal computer, such as a Pentium 4 PC, or a dedicated hardware that can carry out the required computation. The means for control and processing, as well as the means for video interface, can be placed locally or remotely, as long as the connection to the means for capturing images can be established.

The internal means for storing data, such as internal hard disk drives, is placed within the same enclosure as the means for control and processing. The external means for storing data, such as a network storage driver or internal hard disk drives contained in a remote computer, can be placed locally or remotely, as long as a means for transferring data is available.

The present invention can generate time-stamped measurements in accordance with the behavior analysis, segmentation, impression analysis measurement, and emotion change measurement, utilizing a time server 109. The exemplary time server 109 can maintain a synchronized time in the network of means for control and processing. In another exemplary embodiment, a first means for control and processing 107 can act as a server, and a plurality of second means for control and processing 108 can act as clients. The server can run its own local clock or be connected to a global time server 109 for the synchronization utilizing a time synchronization protocol, such as the Network Time Protocol (NTP). The time-stamped measurements facilitate the synchronous comparison among multiple categories.

The number of means for capturing images per a means for control and processing varies, depending on the system configuration in the physical space. However, each means for control and processing knows the identification of the associated plurality of means for capturing images that are assigned to the categories in a store area and the area covered by the means for capturing images.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples provided.

What is claimed is:

1. A method for rating the role of a product category in the performance of a store area based on a measurement of a set of shopper behavior metrics, comprising the following steps of:
   a) automatically tracking people in a plurality of input images captured by at least a means for capturing images that is connected to at least a means for video interface in the store area by applying a computer vision-based automatic tracking algorithm to the plurality of input images, wherein the computer vision-based automatic tracking algorithm is programmed in at least a computer, and
   b) utilizing the computer to perform computations for: analyzing the behavior of the people based on a path analysis of tracks that are produced from tracking the people by executing the computer vision-based automatic tracking algorithm,
   measuring impression counts and impression length of the people for the product category, measuring emotion changes of the people,
   measuring the set of shopper behavior metrics that represent strength of a product category in attracting shoppers with respect to a group of product categories,
   measuring the response of the people tied to the category based on the behavior analysis, the impression counts, and the impression length, and the emotion changes,
   creating a plurality of datasets, stored in at least a means for storing data, by accumulating the response measurement, and
   analyzing the datasets based on segmentation data of the people, including demographic groups and behavior segments,
   wherein the metrics is defined in a manner that is normalized so that it is used across different types of product categories and in different types of stores.

2. The method according to claim 1, wherein the method further comprises a step of defining a set of rating parameters in order to provide a unified and standardized rating system,
    wherein the set of rating parameters is calculated based on a path analysis of tracks that are produced from tracking the people by executing the computer vision-based automatic tracking algorithm and segmentation data.

3. The method according to claim 1, wherein the method further comprises a step of measuring the datasets per category over time to identify how its strength has varied over time and to monitor trends in the category performance.

4. The method according to claim 1, wherein the method further comprises a step of defining category rating metrics in such a way that ratings are combined for multiple stores and extrapolated to a set of stores, including a retail chain, giving a unified framework for analyzing category performance across larger geographical areas,
    wherein the category rating metrics represent effectiveness of the product category in the store area, and
    wherein the category rating metrics are computed based on the set of shopper behavior metrics.

5. The method according to claim 1, wherein the method further comprises a step of ranking the categories based on the number of first-stops as a ratio of total number of category shoppers for all who stopped.

6. The method according to claim 1, wherein the method further comprises a step of ranking the categories based on the number of shoppers and buyers in the category relative to that of a store area.

7. The method according to claim 1, wherein the method further comprises a step of calculating the number of people who shop at the category and later shop at other categories in a store area,
    wherein the measured number determines the relative correlation between the interest in the category relative to a store area.

8. The method according to claim 1, wherein the method further comprises a step of optimizing space for the aisle based on the role of each category, wherein the role of each category is determined from a category strength rating that is calculated based on the measurement of a set of shopper behavior metrics.

9. The method according to claim 1, wherein the method further comprises a step of ranking the categories in an aisle to identify the top categories that contribute to aisle productivity,
    wherein the measurement for the set of shopper behavior metrics is ranked.

10. The method according to claim 1, wherein the method further comprises a step of calculating indices that are defined with respect to observable shopping behavior and measured for a given period,
    wherein the indices comprise indices for category attraction, category synergy, category shopper share, category buyer share, category volume share, category dollar share, shopper response rating, and periodic change rating.

11. The method according to claim 1, wherein the method further comprises a step of measuring the effect of a different assortment of categories to measure which assortments optimize the whole store area,
    wherein the measurement for the effect of the different assortment of categories is based on the computer vision-based automatic tracking.

12. The method according to claim 1, wherein the method further comprises a step of measuring the effect of different allocation of categories to measure what size, relative position of space, shape, and sequence of the allocation performs better,
    wherein the measurement for the effect of the different allocation of categories is based on the computer vision-based automatic tracking.

13. The method according to claim 1, wherein the method further comprises a step of measuring the effect of different adjacency of categories to measure what layout, correlation, and co-occurrence of categories performs better,
    wherein the measurement for the effect of the different adjacency of categories is based on the computer vision-based automatic tracking.

14. The method according to claim 1, wherein the method further comprises a step of changing controllable features in a store area, including location of signage, number of signage, navigational signage, marketing element, merchandizing element, information kiosk, and promotional material in the category, and measuring the effect to the performance of categories.

15. An apparatus for rating the role of a product category in the performance of a store area based on a measurement of a set of shopper behavior metrics, comprising:
    a) at least a means for capturing images that captures a plurality of input images of people in the store area,
    b) at least a means for video interface that is connected to the means for capturing images,
    c) at least a computer that is programmed to perform computations for the following steps of:
    automatically tracking people in the plurality of input images, which are transferred from the means for capturing images through the means for video interface, by applying a computer vision-based automatic tracking algorithm to the plurality of input images using the computer,
    analyzing the behavior of the people based on a path analysis of tracks that are produced from tracking the people by executing the computer vision-based automatic tracking algorithm using the computer,
    measuring impression counts and impression length of the people for the product category, measuring emotion changes of the people,
    measuring the set of shopper behavior metrics that represent strength of a product category in attracting shoppers with respect to a group of product categories, and
    measuring the response of the people tied to the category based on the behavior analysis, the impression counts, the impression length, and the emotion changes, and
    d) at least a means for storing data that stores a plurality of datasets by accumulating the response measurement,
    wherein the computer executes a program that analyzes the datasets based on segmentation data of the people, including demographic groups and behavior segments, and
    wherein the metrics is defined in a manner that is normalized so that it is used across different types of product categories and in different types of stores.

16. The apparatus according to claim 15, wherein the apparatus further comprises a computer for defining a set of rating parameters in order to provide a unified and standardized rating system,
    wherein the set of rating parameters is calculated based on a path analysis of tracks that are produced from tracking the people by executing the computer vision-based automatic tracking algorithm and segmentation data.

17. The apparatus according to claim 15, wherein the apparatus further comprises a computer for measuring the datasets per category over time to identify how its strength has varied over time and to monitor trends in the category performance.

18. The apparatus according to claim 15, wherein the apparatus further comprises a computer for defining category rating metrics in such a way that ratings are combined for multiple stores and extrapolated to a set of stores, including a retail chain, giving a unified framework for analyzing category performance across larger geographical areas,
    wherein the category rating metrics represent effectiveness of the product category in the store area, and
    wherein the category rating metrics are computed based on the set of shopper behavior metrics.

19. The apparatus according to claim 15, wherein the apparatus further comprises a computer for ranking the categories based on the number of first-stops as a ratio of total number of category shoppers for all who stopped.

20. The apparatus according to claim 15, wherein the apparatus further comprises a computer for ranking the categories based on the number of shoppers and buyers in the category relative to that of a store area.

21. The apparatus according to claim 15, wherein the apparatus further comprises a computer for calculating the number of people who shop at the category and later shop at other categories in a store area,
    wherein the measured number determines the relative correlation between the interest in the category relative to a store area.

22. The apparatus according to claim 15, wherein the apparatus further comprises a computer for optimizing space for the aisle based on the role of each category,
    wherein the role of each category is determined from a category strength rating that is calculated based on the measurement of a set of shopper behavior metrics.

23. The apparatus according to claim 15, wherein the apparatus further comprises a computer for ranking the categories in an aisle to identify the top categories that contribute to aisle productivity,
    wherein the measurement for the set of shopper behavior metrics is ranked.

24. The apparatus according to claim 15, wherein the apparatus further comprises a computer for calculating indices that are defined with respect to observable shopping behavior and measured for a given period,
    wherein the indices comprise indices for category attraction, category synergy, category shopper share, category buyer share, category volume share, category dollar share, shopper response rating, and periodic change rating.

25. The apparatus according to claim 15, wherein the apparatus further comprises a computer for measuring the effect of different assortments of categories to measure which assortments optimize the whole store area,
    wherein the measurement for the effect of the different assortment of categories is based on the computer vision-based automatic tracking.

26. The apparatus according to claim 15, wherein the apparatus further comprises a computer for measuring the effect of different allocation of categories to measure what size, relative position of space, shape, and sequence of the allocation performs better,
    wherein the measurement for the effect of the different allocation of categories is based on the computer vision-based automatic tracking.

27. The apparatus according to claim 15, wherein the apparatus further comprises a computer for measuring the effect of different adjacency of categories to measure what layout, correlation, co-occurrence of categories performs better,
    wherein the measurement for the effect of the different adjacency of categories is based on the computer vision-based automatic tracking.

28. The apparatus according to claim 15, wherein the apparatus further comprises a computer for changing controllable features in a store area, including location of signage, number of signage, navigational signage, marketing element, merchandizing element, information kiosk, and promotional material in the category, and measuring the effect to the performance of categories.

\* \* \* \* \*